(12) United States Patent
Senko

(10) Patent No.: US 12,451,315 B2
(45) Date of Patent: Oct. 21, 2025

(54) ION GUIDE ELECTRODE CONFIGURATIONS FOR POLARITY-INDEPENDENT ION CONTAINMENT

(71) Applicant: Thermo Finnigan LLC, San Jose, CA (US)

(72) Inventor: Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 377 days.

(21) Appl. No.: 17/877,781

(22) Filed: Jul. 29, 2022

(65) Prior Publication Data

US 2024/0038476 A1   Feb. 1, 2024

(51) Int. Cl.
| | |
|---|---|
| *H01J 3/40* | (2006.01) |
| *H01J 49/06* | (2006.01) |
| *H01J 49/42* | (2006.01) |

(52) U.S. Cl.
CPC .............. *H01J 3/40* (2013.01); *H01J 49/063* (2013.01); *H01J 49/065* (2013.01); *H01J 49/4225* (2013.01)

(58) Field of Classification Search
None
See application file for complete search history.

(56) References Cited

U.S. PATENT DOCUMENTS

| | | | |
|---|---|---|---|
| 7,180,078 B2 * | 2/2007 | Pau ................. | H01J 49/42 |
| | | | 250/378 |
| 9,892,899 B2 * | 2/2018 | Gill ................. | H01J 49/063 |
| | (Continued) | | |

FOREIGN PATENT DOCUMENTS

| | | | | |
|---|---|---|---|---|
| WO | WO-2004029614 A1 * | 4/2004 | ........... | G01N 27/624 |
| WO | WO-2007149706 A2 * | 12/2007 | ........... | H01J 49/063 |
| | (Continued) | | | |

OTHER PUBLICATIONS

EP23185596.6, Extended European Search Report, Dec. 8, 2023, 10 pages.

*Primary Examiner* — Robert H Kim
*Assistant Examiner* — Alina Kaliszewski
(74) *Attorney, Agent, or Firm* — ALG Intellectual Property, LLC

(57) ABSTRACT

An ion guide includes a first arrangement of electrodes on a first surface, a second arrangement of electrodes on a second surface, and an ion containment space in a gap therebetween. The first arrangement includes first electrodes and second electrodes. Each first electrode includes a first main portion and a first edge portion. The first edge portion is wider than the first main portion. The second arrangement includes third electrodes and fourth electrodes. Each fourth electrode includes a fourth main portion and a fourth edge portion. The fourth edge portion is wider than the fourth main portion. The first edge portions are positioned opposite the fourth edge portions. The first electrodes and the third electrodes are configured to receive first RF voltages and the second electrodes and the fourth electrodes are configured to receive second RF voltages that are phase-shifted with respect to the first RF voltages.

20 Claims, 16 Drawing Sheets

(56) References Cited

U.S. PATENT DOCUMENTS

| | | | |
|---|---|---|---|
| 2008/0073515 A1* | 3/2008 | Schoen | H01J 49/062 |
| | | | 250/292 |
| 2009/0206250 A1* | 8/2009 | Wollnik | G01N 27/622 |
| | | | 250/290 |
| 2015/0076343 A1* | 3/2015 | Tolmachev | H01J 49/062 |
| | | | 250/200 |
| 2016/0189947 A1* | 6/2016 | Zhou | G01N 27/622 |
| | | | 250/294 |
| 2019/0057852 A1* | 2/2019 | Ibrahim | G01N 27/622 |
| 2020/0006045 A1* | 1/2020 | Stewart | H01J 49/4215 |
| 2021/0151307 A1 | 5/2021 | Guna | |
| 2021/0272787 A1* | 9/2021 | Baba | H01J 49/0077 |
| 2022/0102128 A1* | 3/2022 | Wang | H01J 49/065 |

FOREIGN PATENT DOCUMENTS

| | | | | |
|---|---|---|---|---|
| WO | WO-2008024927 A2 * | 2/2008 | | H02N 11/002 |
| WO | WO-2008157019 A2 * | 12/2008 | | H01J 49/065 |

* cited by examiner

ION GUIDE ELECTRODE CONFIGURATIONS FOR POLARITY-INDEPENDENT ION CONTAINMENT

BACKGROUND INFORMATION

Ion guides are devices that guide ions along an ion path by application of electrostatic and electrodynamic fields and/or by a carrier gas. Ion guides may be used, for example, to transport ions within a mass spectrometer or to separate ions within an ion mobility device. Conventional ion guides are formed of multipole arrangements, such as linear quadrupole devices, or electrode arrangements on opposing surfaces, such as printed circuit boards (PCBs). PCB ion guides are appealing due to their low cost and the possibility of creating complex geometries with a fairly simple printing process. However, conventional configurations of PCB ion guides have various drawbacks. For example, to maintain ions within the ion path, some PCB ion guides apply a radio frequency (RF) voltage to inner RF electrodes to provide a trapping potential in a Y (vertical) direction and apply a direct current (DC) voltage to outer guard electrodes to provide a trapping potential in an X (horizontal) direction. Ions are guided along the ion path along a Z axis. However, the trapping potential generated by the DC guard electrodes can trap ions of only a single polarity. Other PCB ion guides use additional RF electrodes positioned in the space between the upper and lower PCBs to provide polarity independent trapping along the X axis. However, these additional RF guard electrodes require additional driving electronics and complicate the design and manufacture of the ion guides.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, an ion guide comprises a first surface and a second surface positioned opposite the first surface and a plurality of electrodes comprising a first arrangement of electrodes on the first surface and a second arrangement of electrodes on the second surface, the first arrangement of electrodes and the second arrangement of electrodes positioned opposite one another and defining an ion containment space therebetween, wherein: the first arrangement of electrodes comprises first electrodes and second electrodes arranged on the first surface along a longitudinal axis of the ion containment space; each first electrode comprises a first main portion extending from a first side of the ion containment space to a second side of the ion containment space and a first edge portion at the first side of the ion containment space, the first edge portion being wider, along the longitudinal axis of the ion containment space, than the first main portion; the second arrangement of electrodes comprises third electrodes and fourth electrodes arranged on the second surface along the longitudinal axis of the ion containment space; each fourth electrode comprises a fourth main portion extending from the first side of the ion containment space to the second side of the ion containment space and a fourth edge portion at the first side of the ion containment space, the fourth edge portion being wider, along the longitudinal axis of the ion containment space, than the fourth main portion; the first edge portions of the first electrodes are positioned opposite the fourth edge portions of the fourth electrodes; and the first electrodes and the third electrodes are configured to receive first RF voltages and the second electrodes and the fourth electrodes are configured to receive second RF voltages that are phase-shifted with respect to the first RF voltages.

In some illustrative examples, a method of guiding ions comprises: introducing ions into an ion guide comprising a first surface and a second surface positioned opposite the first surface and a plurality of electrodes comprising a first arrangement of electrodes on the first surface and a second arrangement of electrodes on the second surface, the first arrangement of electrodes and the second arrangement of electrodes positioned opposite one another and defining an ion containment space therebetween, wherein: the first arrangement of electrodes comprises first electrodes and second electrodes arranged on the first surface along a longitudinal axis of the ion containment space; each first electrode comprises a first main portion extending from a first side of the ion containment space to a second side of the ion containment space and a first edge portion at the first side of the ion containment space, the first edge portion being wider, along the longitudinal axis of the ion containment space, than the first main portion; the second arrangement of electrodes comprises third electrodes and fourth electrodes alternately arranged on the second surface along the longitudinal axis of the ion containment space; each fourth electrode comprises a fourth main portion extending from the first side of the ion containment space to the second side of the ion containment space and a fourth edge portion at the first side of the ion containment space, the fourth edge portion being wider, along the longitudinal axis of the ion containment space, than the fourth main portion; and the first edge portions of the first electrodes are positioned opposite the fourth edge portions of the fourth electrodes; and applying RF voltages to the plurality of electrodes, the first electrodes and the third electrodes receiving first RF voltages and the second electrodes and the fourth electrodes receiving second RF voltages that are phase-shifted with respect to the first RF voltages.

In some illustrative examples, an ion guide comprises a first surface and a second surface positioned opposite the first surface and a plurality of electrodes comprising a first arrangement of electrodes on the first surface and a second arrangement of electrodes on the second surface, the first arrangement of electrodes and the second arrangement of electrodes positioned opposite one another and defining an ion containment space therebetween, wherein: the first arrangement of electrodes comprises first electrodes and second electrodes alternately arranged on the first surface along a longitudinal axis of the ion containment space; the second arrangement of electrodes comprises third electrodes and fourth electrodes alternately arranged on the second surface along the longitudinal axis of the ion containment space; the first electrodes and the third electrodes are configured to receive RF voltages of the same phase; the second electrodes and the fourth electrodes are configured to receive RF voltages having the same phase and that are phase shifted with respect to the RF voltages received by the first electrodes and the third electrodes; opposing main portions of the first electrodes and the third electrodes and opposing main portions of the second electrodes and the fourth electrodes are configured to generate surface containment electric fields that inhibit movement of the ions within the ion containment space toward the first surface and the second surface; and opposing edge portions of the first electrodes and the fourth electrodes are configured to receive RF voltages that are phase-shifted with respect to one another and generate a first edge containment electric field that inhibit movement of the ions within the ion containment space toward a first side of the ion containment space.

In some illustrative examples, an ion guide comprises a first surface and a second surface positioned opposite the first surface, a plurality of electrodes comprising a first arrangement of electrodes on the first surface and a second arrangement of electrodes on the second surface, and an ion containment space between the first arrangement of electrodes and the second arrangement of electrodes; wherein: the first arrangement of electrodes comprises first electrodes and second electrodes arranged on the first surface along a longitudinal axis of the ion containment space; the second arrangement of electrodes comprises third electrodes and fourth electrodes arranged on the second surface along the longitudinal axis of the ion containment space; first main portions of the first electrodes are positioned opposite third main portions of the third electrodes; second main portions of the second electrodes are positioned opposite fourth main portions of the fourth electrodes; first edge portions of the first electrodes are positioned opposite fourth edge portions of the fourth electrodes at a first side of the ion containment space; the first electrodes and the third electrodes are configured to receive RF voltages; and the second electrodes and the fourth electrodes are configured to receive RF voltages that are phase-shifted with respect to the RF voltages received by the first electrodes and the third electrodes.

In some illustrative examples, a method of making an ion guide comprises arranging first electrodes and second electrodes on a first surface in a first arrangement of electrodes; arranging third electrodes and fourth electrodes on a second surface in a second arrangement of electrodes; and positioning the first surface opposite the second surface so that the first arrangement of electrodes and the second arrangement of electrodes define an ion containment space therebetween, wherein the first arrangement of electrodes and the second arrangement of electrodes are positioned so that first main portions of the first electrodes are positioned opposite third main portions of the third electrodes, second main portions of the second electrodes are positioned opposite fourth main portions of the fourth electrodes, and first edge portions of the first electrodes are positioned opposite fourth edge portions of the fourth electrodes at a first side of the ion containment space; connecting the first electrodes and the third electrodes to a first circuit configured to receive RF voltages; and connecting the second electrodes and the fourth electrodes to a second circuit configured to receive RF voltages that are phase-shifted with respect to the RF voltages received by the first circuit.

In some illustrative examples, an ion guide comprises a plurality of electrodes arranged on opposing surfaces and defining an ion containment space between the opposing surfaces, wherein: each electrode of the plurality of electrodes comprises an elongate main portion and an edge portion at an end of the main portion, the edge portion being wider, along a longitudinal axis of the ion containment space, than the main portion; the plurality of electrodes are configured to receive RF voltages; and the plurality of electrodes are arranged so that opposing main portions receive RF voltages of a same phase and opposing edge portions receive RF voltages that are phase-shifted with respect to one another.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
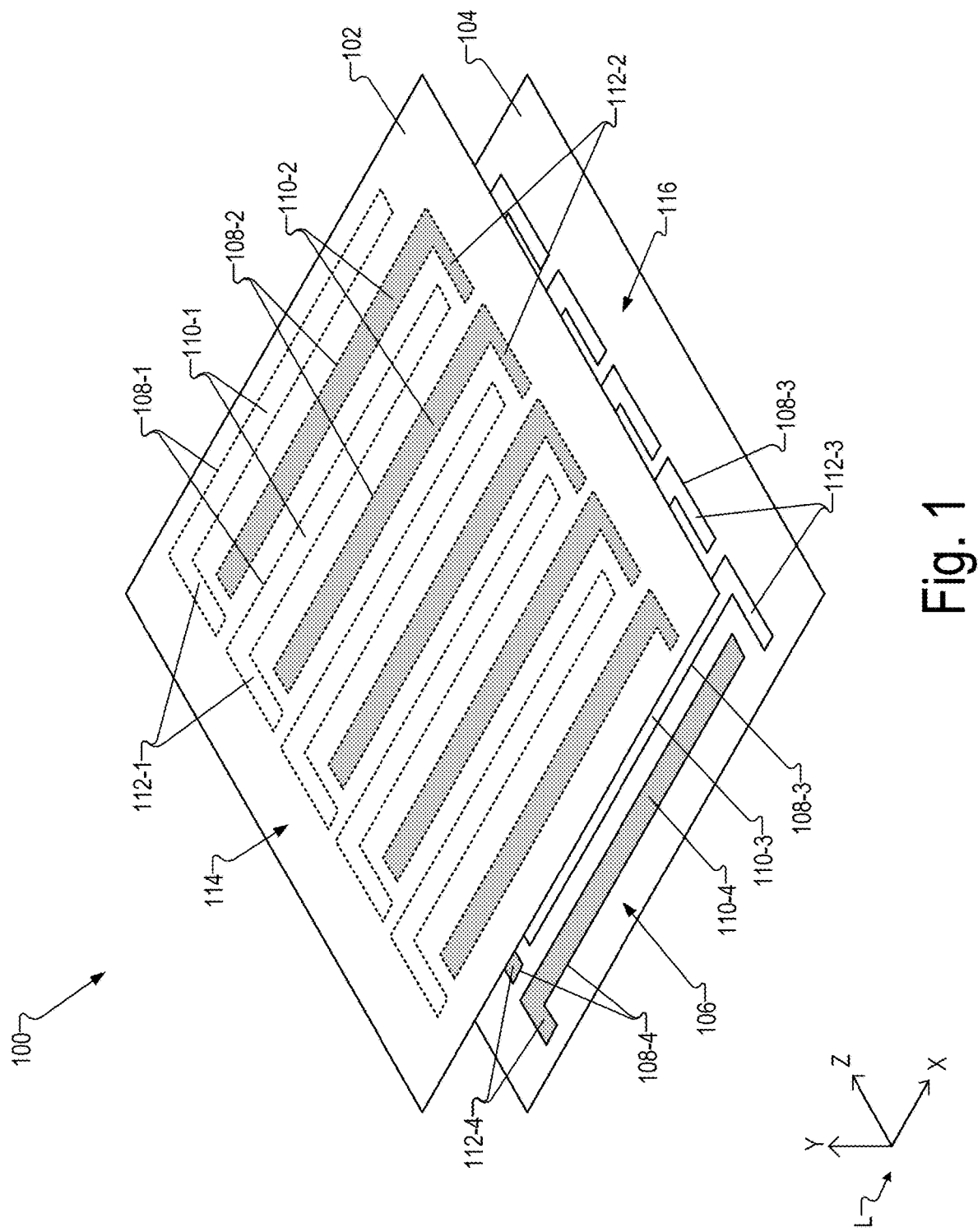
FIG. 1 shows a perspective view of an illustrative ion guide.

Illustrative ion guides that provide polarity independent trapping in multiple directions are described herein. In some examples, an ion guide includes a first surface (e.g., a first PCB), a second surface (e.g., a second PCB) positioned opposite the first surface, and a plurality of electrodes. The plurality of electrodes includes a first arrangement of electrodes on the first surface and a second arrangement of electrodes on the second surface. The first arrangement of electrodes and the second arrangement of electrodes are positioned opposite one another and define an ion containment space therebetween in which ions may be contained. The first arrangement of electrodes includes first electrodes and second electrodes arranged on the first surface along a longitudinal axis of the ion containment space. Each first electrode includes a first main portion extending from a first side of the ion containment space to a second side of the ion containment space and a first edge portion at the first side of the ion containment space. The first edge portion is wider, along the longitudinal axis of the ion containment space, than the first main portion. The second arrangement of electrodes includes third electrodes and fourth electrodes arranged on the second surface along the longitudinal axis of the ion containment space. Each fourth electrode includes a fourth main portion extending from the first side of the ion containment space to the second side of the ion containment space and a fourth edge portion at the first side of the ion containment space. The fourth edge portion is wider, along the longitudinal axis of the ion containment space, than the fourth main portion. The first edge portions of the first electrodes are positioned opposite the fourth edge portions of the fourth electrodes. The first electrodes and the third electrodes are configured to receive first RF voltages and the second electrodes and the fourth electrodes are configured to receive second RF voltages that are phase-shifted with respect to the first RF voltages.

The ion guides described herein have various advantages over conventional ion guides. For example, the electrode configurations described herein generate edge containment electric fields and surface containment electric fields that contain ions within the ion containment space along a first axis (e.g., an X (horizontal) axis) and a second axis (e.g., a Y (vertical) axis), respectively, independently of the polarity of the ions. Furthermore, the ion guides described herein have a simple construction because the ion containment along the X axis is provided by the same electrodes that provide ion containment along the Y axis. Moreover, the same RF voltages, and hence the same electronic drive circuitry, are used to generate the edge containment electric fields and the surface containment electric fields, thus simplifying the construction and operation of the ion guides.

Various embodiments will now be described in more detail with reference to the figures. The systems and methods described herein may provide one or more of the benefits mentioned above and/or various additional and/or alternative benefits that will be made apparent herein.

Figure 2:
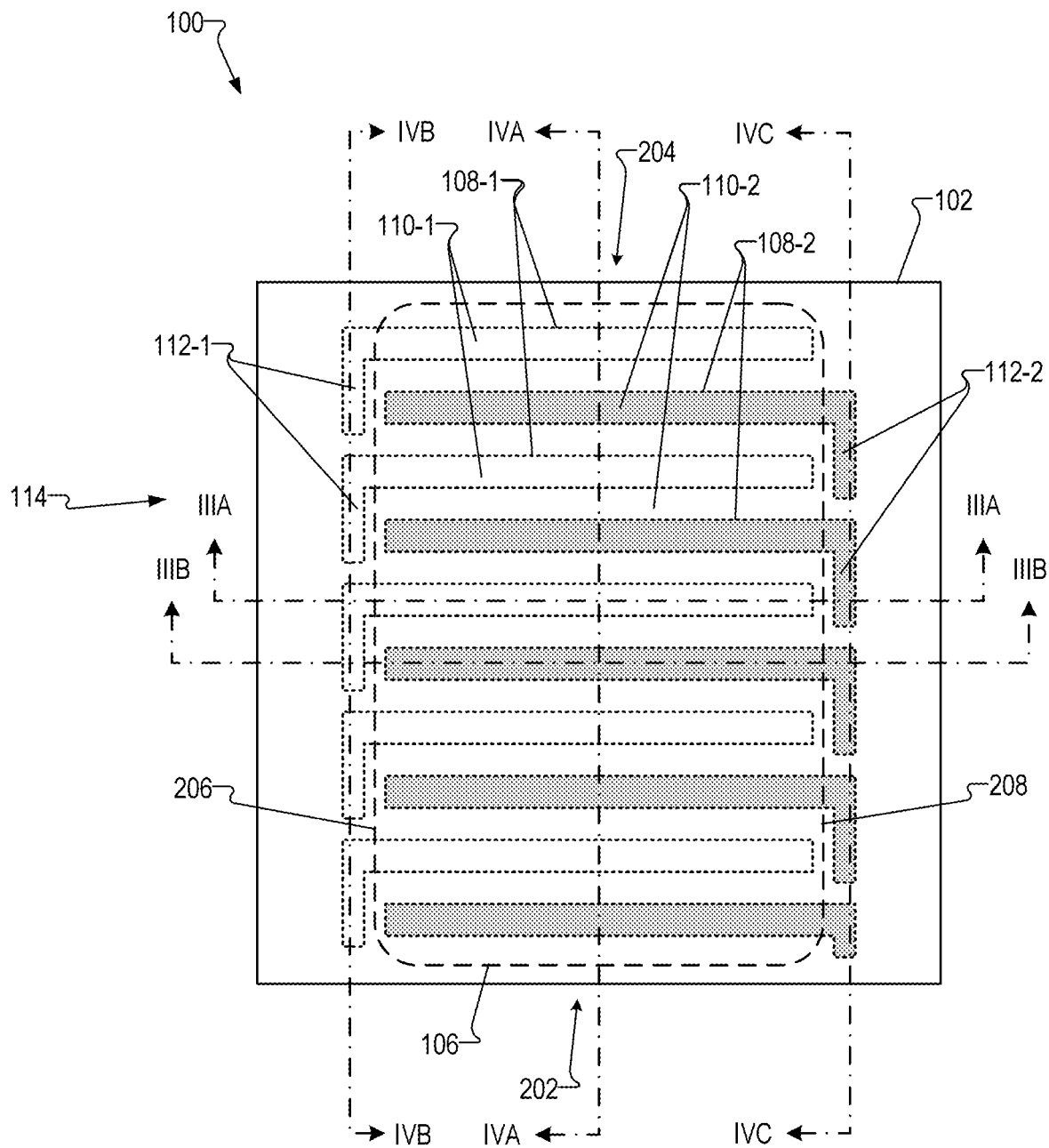
FIG. 2 shows a plan view of the ion guide of FIG. 1.
Figure 3A:
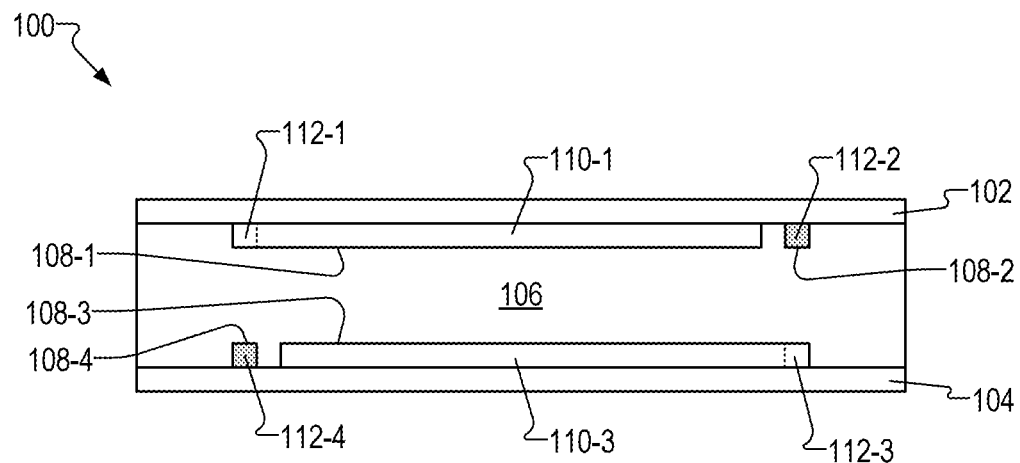
FIGS. 3A and 3B show cross-sectional views of the ion guide of FIGS. 1 and 2 taken along the dash-dot-dash lines labeled IIIA and IIIB, respectively, in FIG. 2.
Figure 3B:
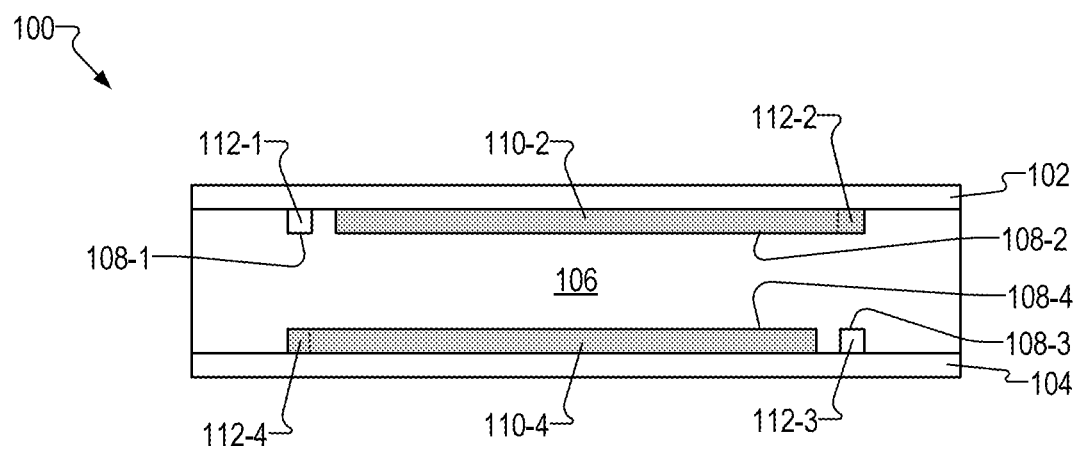
Figure 4A:
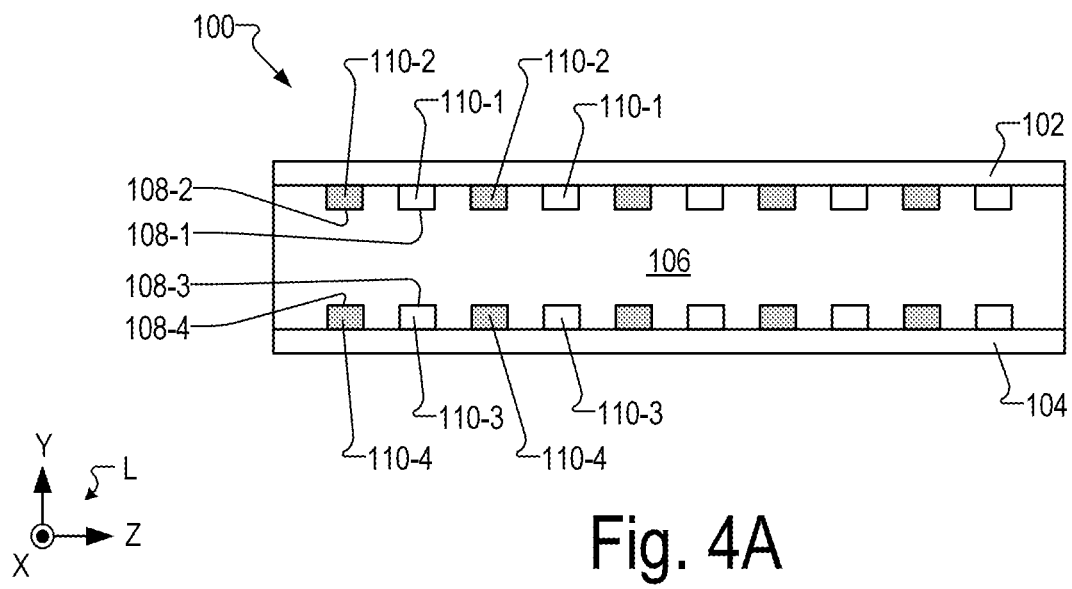
FIGS. 4A-4C show cross-sectional views of the ion guide of FIGS. 1 and 2 taken along the dash-dot-dash lines labeled IVA, IVB, and IVC, respectively, in FIG. 2.
Figure 4B:
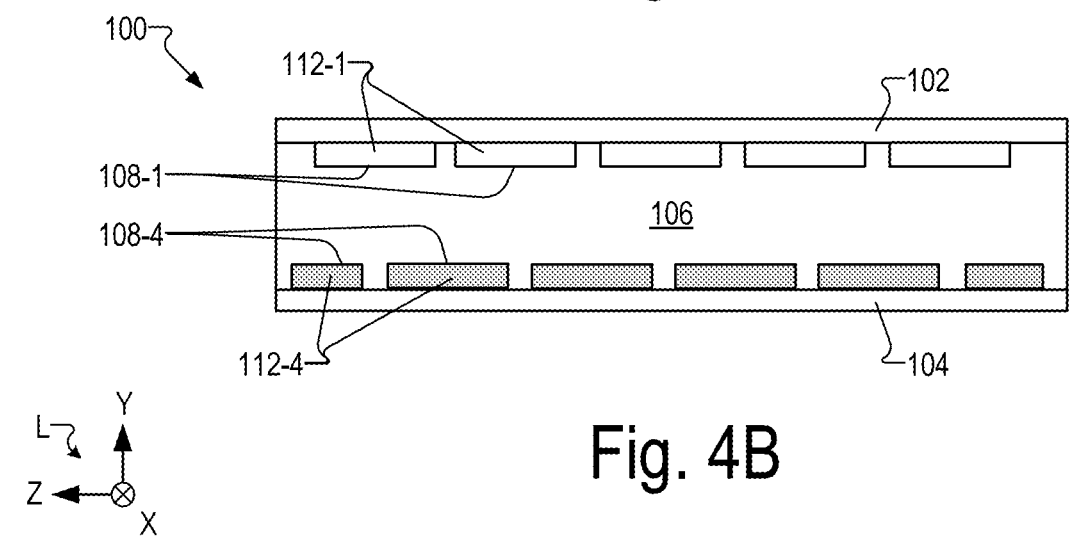
Figure 4C:
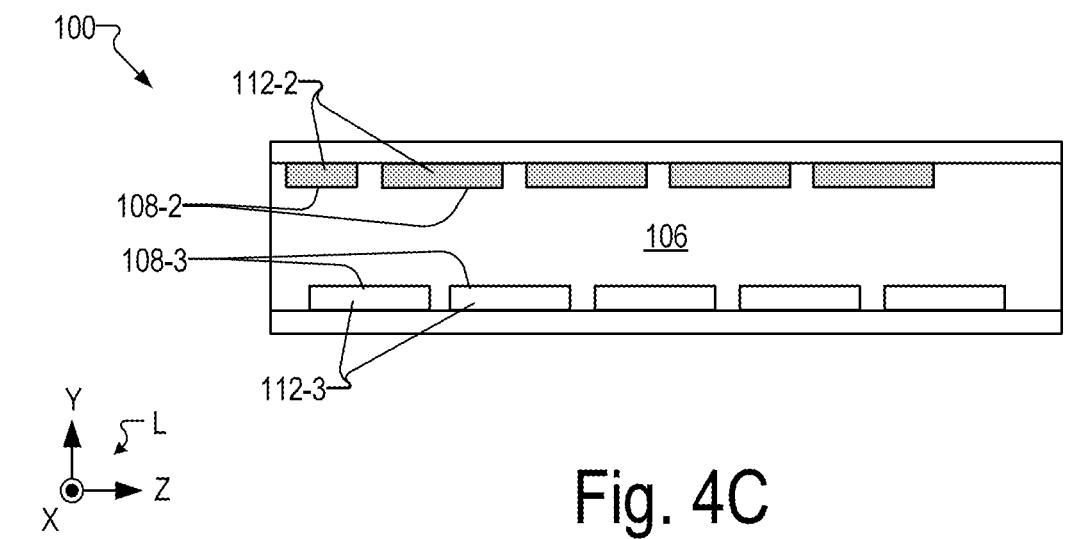

FIGS. 1-4C show various views of an illustrative ion guide 100. FIG. 1 shows a perspective view of ion guide 100. FIG. 2 shows a plan view of ion guide 100. FIGS. 3A and 3B show cross-sectional views of ion guide 100 taken along the dash-dot-dash lines labeled IIIA and IIIB, respectively, in FIG. 2. FIGS. 4A-4C show cross-sectional views of ion guide 100 taken along the dash-dot-dash lines labeled IVA, IVB, and IVC, respectively, in FIG. 2.

Ion guide 100 includes a first surface 102, a second surface 104, an ion containment space 106 between first surface 102 and second surface 104, and a plurality of electrodes 108 comprising first electrodes 108-1 and second electrodes 108-2 arranged on first surface 102 and third electrodes 108-3 and fourth electrodes 108-4 arranged on second surface 104. In FIGS. 1 and 2, electrodes 108 on first surface 102 are shown in broken line to indicate that the electrodes 108 are positioned on a side of first surface 102 facing second surface 104. Although not shown, ion guide 100 may include other components as may suit a particular implementation, such as spacers that maintain a spacing between first surface 102 and second surface 104, wiring for connecting electrodes 108 to a voltage source, and electronics for controlling a voltage applied to electrodes 108.

FIGS. 1-4C are merely representative of ion guide 100, as ion guide 100 may have any other number and arrangement of electrodes 108. For example, while FIGS. 1, 2, and 4A show that first surface 102 and second surface 104 each have ten electrodes 108, first surface 102 and second surface 104 may have any other number of electrodes 108 as may suit a particular implementation.

FIGS. 1-4C show a legend L of a 3D coordinate system that has been arbitrarily oriented so that a longitudinal axis of ion containment space 106 (e.g., an ion propagation direction when ion guide 100 is a transmission device) extends along the Z axis and first surface 102 and second surface 104 each lie in an XZ plane and are positioned opposite one another along the Y axis. As used herein, an X, Y, or Z axis refers to the X, Y, or Z axis of legend L or any other 3D coordinate system oriented similarly to legend L. For example, an "X axis" may refer to the X axis of legend L or any other axis parallel to the X axis of legend L, a "Y axis" may refer to the Y axis of legend L or any other axis parallel to the Y axis of legend L, and a "Z axis" may refer to the Z axis of legend L or any other axis parallel to the Z axis of legend L.

First surface 102 and second surface 104 are planar surfaces positioned substantially parallel to one another and facing one another with a gap therebetween. First surface 102 and second surface 104 may each be implemented by any suitable planar structure, such as a PCB or a solid substrate (e.g., a glass substrate, a ceramic substrate, a polymer substrate, etc.). In other embodiments, first surface 102 and second surface 104 are not planar but have a curved, contoured, or other non-planar shape as may suit a particular implementation.

Ion containment space 106 is a volume in the gap between first surface 102 and second surface 104 in which ions may be contained (e.g., trapped, guided, etc.). As will be explained below in more detail, pairs of opposing electrodes 108 across ion containment space 106 receive RF voltages and generate surface containment electric fields and edge containment electric fields to contain ions within ion containment space 106. Ion containment space 106 may be under vacuum, low pressure, or high pressure.

In some examples, ion guide 100 is a transmission type device in which ion containment space 106 forms an ion path through which ions are guided. Ions may be guided (e.g., driven) through ion containment space 106 in any suitable way, such as by applying DC and/or RF voltages to electrodes 108 (or to other electrodes not shown) to superimpose on the containment electric fields a DC gradient field (e.g., by using a voltage divider), a DC traveling wave (e.g., DC pulses that move from one electrode the next), and/or an RF field. Additionally or alternatively, ions may be guided through ion containment space 106 by passing a carrier gas through ion containment space 106. In other examples, ion guide 100 is a trapping type device in which ion containment space 106 is a trapping volume that traps ions until the ions are ejected from ion containment space 106.

Referring now to FIG. 2, ion containment space 106 includes an entrance aperture 202, an exit aperture 204, a first side 206, and a second side 208. Entrance aperture 202 is an opening for the introduction of ions into ion containment space 106 and exit aperture 204 is an opening through which ions may exit or be ejected from ion containment space 106. Entrance aperture 202 is located at an upstream end of the longitudinal axis of ion containment space 106 and exit aperture 204 is located at a downstream end of the longitudinal axis of ion containment space 106. However, entrance aperture 202 and/or exit aperture 204 may be located at any other location as may suit a particular implementation. First side 206 and second side 208 extend along the longitudinal axis (e.g., the Z axis) of ion containment space 106 opposite one another. For example, as shown in FIG. 2, first side 206 is located at a −X side of ion containment space 106 and second side 208 is located at a +X side of ion containment space 106.

Referring again to FIGS. 1-4C, electrodes 108 are formed of an electrically conductive material (e.g., a metal) and are configured to receive RF voltages. Each electrode 108 has a main portion 110 and an edge portion 112. For example, each first electrode 108-1 has a first main portion 110-1 and a first edge portion 112-1, each second electrode 108-2 has a second main portion 110-2 and a second edge portion 112-2, and so forth.

As shown, each main portion 110 has an elongate rectangular shape and extends along the X axis (e.g., along an axis that is perpendicular to the longitudinal axis of ion containment space 106 and parallel to first surface 102 and second surface 104) from first side 206 to second side 208 of ion containment space 106. However, main portions 110 are not limited to this configuration, but may have any other suitable shape (e.g., curved, elliptical, oval, wavy, or irregular) and/or orientation relative to the longitudinal axis of ion containment space 106. As will be explained below, a pair of opposing main portions 110 that receive RF voltages of the same phase generate surface containment electric fields that inhibit ions from moving within ion containment space 106 toward first surface 102 and second surface 104.

Each edge portion 112 is formed at an end (along the X axis) of a main portion 110 and is wider, along the longitudinal axis of ion containment space 106 (e.g., along the Z axis), than the main portion 110. As shown in FIGS. 1 and 2, electrodes 108 have an L-shape, although other shapes are also contemplated, some of which are described below in alternative examples. In examples in which main portion 110 is not rectangular or straight (e.g., is oval, curved, wavy, or irregular), edge portion 112 may be wider than the immediately adjacent end of main portion 110 to which edge portion 112 is connected. Additionally or alternatively, edge portion 112 may be wider than the average or maximum width of main portion 110. As shown in FIGS. 1-4C, each edge portion 112 extends, along the longitudinal axis of ion containment space 106, past all or a part of the main portion 110 of an adjacent electrode 108 (e.g., overlaps all or a part of the main portion 110, as viewed along the X direction). As will be explained below, opposing edge portions 112 that receive RF voltages that are phase-shifted with respect to one another generate an edge containment electric field that inhibits ions from moving toward first side 206 and second side 208 of ion containment space 106.

As mentioned above, first surface 102 includes a first arrangement 114 of electrodes 108 and second surface 104 includes a second arrangement 116 of electrodes 108 positioned opposite to first arrangement 114. First arrangement 114 and second arrangement 116 define ion containment space 106 therebetween.

First arrangement 114 includes first electrodes 108-1 and second electrodes 108-2 alternately arranged so that each edge portion 112 extends, along the longitudinal axis of ion containment space 106, past all or a part of the main portion 110 of an adjacent first electrode 108-1 or second electrode 108-2. As shown in FIGS. 1, 2, 4B, and 4C, each first edge portion 112-1 of a first electrode 108-1 extends beyond the second main portion 110-2 of the next (or prior) adjacent (in the −Z direction) second electrode 108-2. Similarly, each second edge portion 112-2 of a second electrode 108-2 extends beyond the first main portion 110-1 of the next (or prior) adjacent (in the −Z direction) first electrode 108-1. In alternative configurations (not shown), edge portions 112 of a pair of adjacent electrodes 108 extend past one another. For example, a first edge portion 112-1 of a first electrode 108-1 may extend past all or a part of a second main portion 110-2 of an adjacent (in the −Z direction) second electrode 108-2, and a second edge portion 112-2 of the second electrode 108-2 may extend past all or a part of the first main portion 110-1 of the adjacent (in the +Z direction) first electrode 108-1.

Second arrangement 116 includes third electrodes 108-3 and fourth electrodes 108-4 alternately arranged so that each edge portion 112 extends, along the longitudinal axis of ion containment space 106, past all or a part of the main portion 110 of an adjacent third electrode 108-3 or fourth electrode 108-4. As shown in FIGS. 1, 2, 4B, and 4C, each third edge portion 112-3 of a third electrode 108-3 extends beyond the fourth main portion 110-4 of the next (or prior) adjacent (in the −Z direction) fourth electrode 108-4. Similarly, each fourth edge portion 112-4 of a fourth electrode 108-4 extends beyond the third main portion 110-3 of the next (or prior) adjacent (in the −Z direction) third electrode 108-3. In alternative configurations (not shown), edge portions 112 of a pair of adjacent electrodes 108 extend past one another. For example, a third edge portion 112-3 of a third electrode 108-3 may extend past all or a part of a fourth main portion 110-4 of an adjacent (in the −Z direction) fourth electrode 108-4, and a fourth edge portion 112-4 of the fourth electrode 108-4 may extend past all or a part of the third main portion 110-3 of the adjacent (in the +Z direction) third electrode 108-3.

With the configurations just described each edge portion 112 extends, along the longitudinal axis of ion containment space 106, past all or part of the main portion 110 of an adjacent electrode 108. Accordingly, first edge portions 112-1 of first electrodes 108-1 are positioned adjacent to one another along the first side 206 of ion containment space 106 and second edge portions 112-2 of second electrodes 108-2 are positioned adjacent to one another along the second side 208 of ion containment space 106. Similarly, third edge portions 112-3 of third electrodes 108-3 are positioned adjacent to one another along the second side 208 of ion containment space 106 and fourth edge portions 112-4 of fourth electrodes 108-4 are positioned adjacent to one another along the first side 206 of ion containment space 106.

As mentioned, electrodes 108 are configured to receive RF voltages and generate surface containment electric fields and edge containment electric fields to contain ions within ion containment space 106. In the configurations described above, first electrodes 108-1 and third electrodes 108-3 are configured to receive RF voltages having the same phase and second electrodes 108-2 and fourth electrodes 108-4 are configured to receive RF voltages of the same phase but are phase-shifted with respect to the RF voltages received by first electrodes 108-1 and third electrodes 108-3. In the figures, electrodes 108 of a first phase (e.g., first electrodes 108-1 and third electrodes 108-3) are shown in white and electrodes 108 of a second, opposite phase (e.g., second electrodes 108-2 and fourth electrodes 108-4) are shaded. In some examples, the RF voltages received by first electrodes 108-1 and third electrodes 108-3 are 180° out of phase with the RF voltages received by second electrodes 108-2 and fourth electrodes 108-4. Accordingly, first arrangement 114 and second arrangement 116 may be positioned opposite one another so that pairs of opposing main portions 110 receive RF voltages having the same phase or that are phase-shifted with respect to one another and pairs of opposing edge portions 112 receive RF voltages that are phase-shifted with respect to one another.

For example, first main portions 110-1 of first electrodes 108-1 are positioned opposite third main portions 110-3 of third electrodes 108-3, as shown in FIGS. 1, 3A, and 4A.

Similarly, second main portions 110-2 of second electrodes 108-2 are positioned opposite fourth main portions 110-4 of fourth electrodes 108-4, as shown in FIGS. 1, 3B, and 4A. At first side 206 of ion containment space 106, first edge portions 112-1 of first electrodes 108-1 are positioned opposite fourth edge portions 112-4 of fourth electrodes 108-4, as shown in FIGS. 1, 3A, 3B, and 4B. At second side 208 of ion containment space 106, second edge portions 112-2 of second electrodes 108-2 are positioned opposite third edge portions 112-3 of third electrodes 108-3, as shown in FIGS. 1, 3A, 3B, and 4C.

In some examples, first electrodes 108-1 and third electrodes 108-3 are connected to a first circuit (not shown) configured to supply first RF voltages from a voltage source (not shown) and second electrodes 108-2 and fourth electrodes 108-4 are connected to a second circuit (not shown) configured to supply second RF voltages from the same voltage source or a different voltage source. The second RF voltages are phase-shifted with respect to the first RF voltages. In examples in which the voltage source is the same for the first circuit and the second circuit, either the first circuit or the second circuit may include any suitable phase shift circuit or phase shift module.

As shown in FIG. 1, edge portions 112 of L-shaped electrodes 108 of first arrangement 114 (e.g., first electrodes 108-1 and second electrodes 108-2) extend in the same direction (e.g., the −Z direction) as edge portions 112 of L-shaped electrodes 108 of second arrangement 116 (e.g., third electrodes 108-3 and fourth electrodes 108-4). In alternative configurations, edge portions 112 of L-shaped electrodes 108 of first arrangement 114 extend, along the Z axis, in an opposite direction (e.g., a +Z direction) than edge portions 112 of L-shaped electrodes 108 of second arrangement 116 (e.g., a −Z direction).

Figure 5:
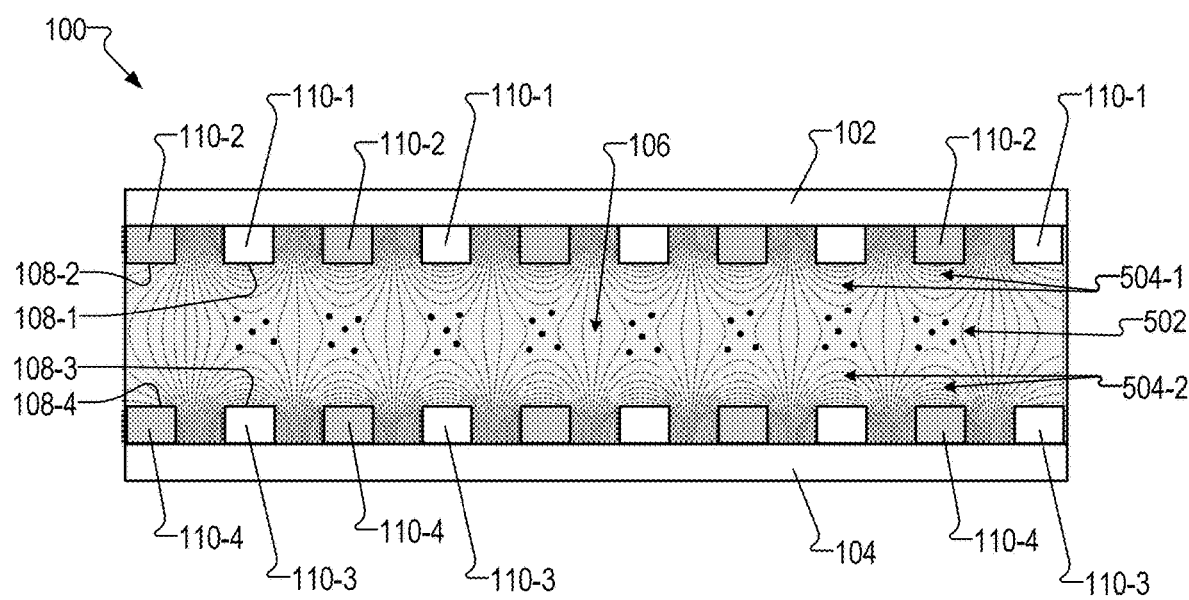
FIG. 5 shows a cross sectional view of the ion guide of FIGS. 1 and 2 and equipotential lines of illustrative containment electric fields generated by electrodes of the ion guide when the electrodes receive RF voltages.
Figure 5:
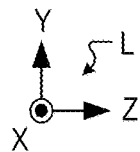
Figure 6A:
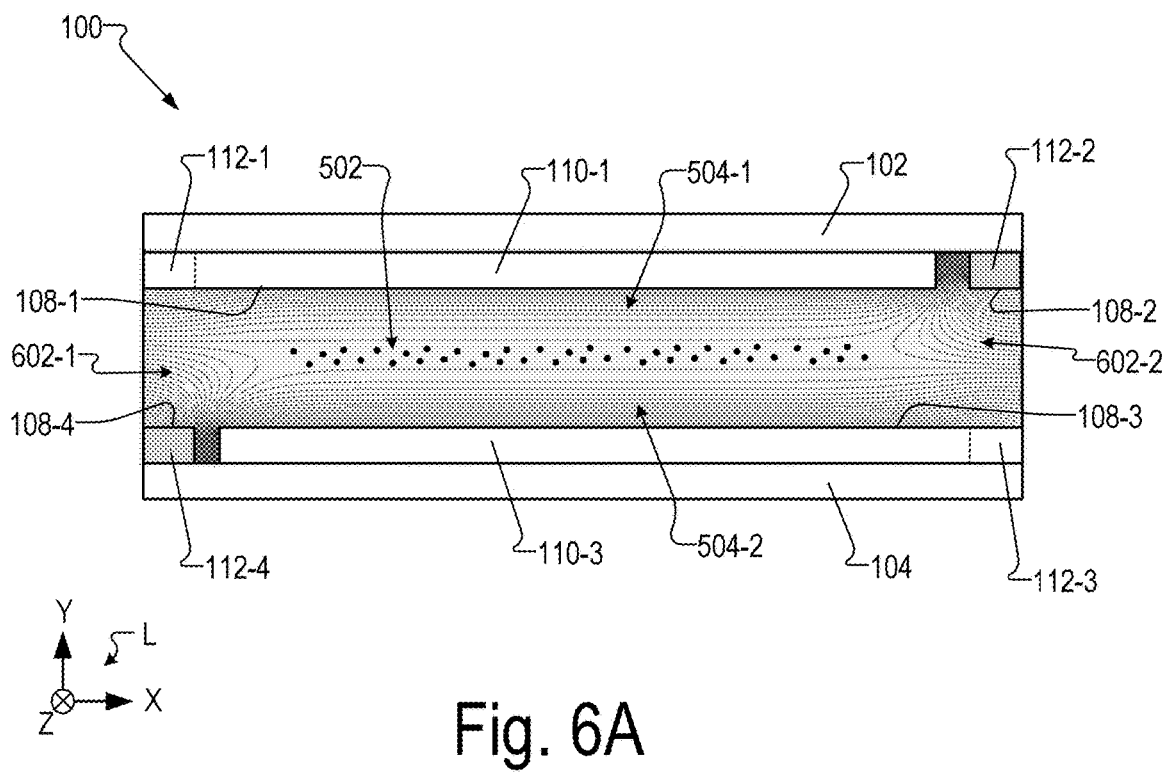
FIGS. 6A and 6B show cross sectional views of the ion guide of FIGS. 1 and 2 and equipotential lines of illustrative containment electric fields generated by electrodes 108 when electrodes 108 receive the RF voltages.
Figure 6B:
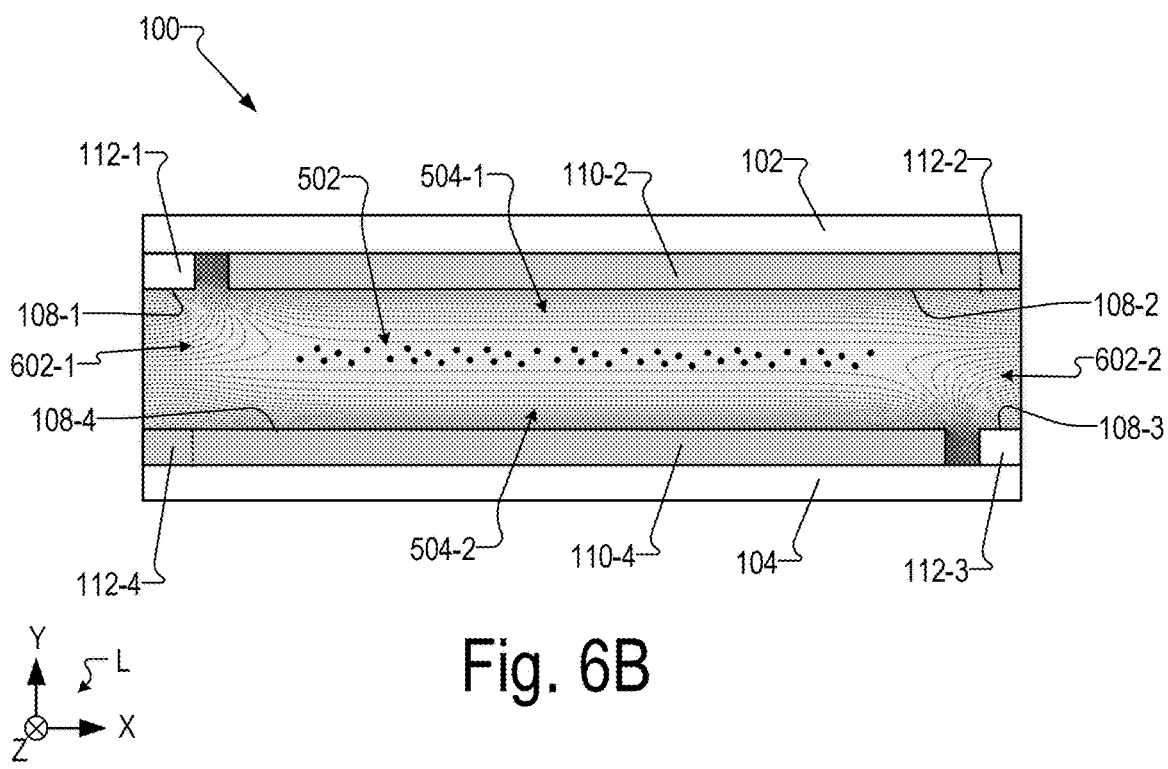

Operation of ion guide 100 will now be described with reference to FIGS. 5, 6A, an 6B. FIG. 5 is similar to FIG. 4A and shows a cross sectional view of ion guide 100 and equipotential lines of illustrative containment electric fields generated by electrodes 108 when electrodes 108 receive RF voltages. FIGS. 6A and 6B are similar to FIGS. 3A and 3B, respectively, and show cross sectional views of ion guide 100 and equipotential lines of illustrative containment electric fields generated by electrodes 108 when electrodes 108 receive the RF voltages. When electrodes 108 receive RF voltages, main portions 110 and edge portions 112 of electrodes 108 generate containment electric fields to contain ions 502 within ion containment space 106, as will now be explained.

Pairs of opposing main portions 110 of first electrodes 108-1 and third electrodes 108-3 generate surface containment electric fields. As shown in FIGS. 5 and 6A, first main portions 110-1 of first electrodes 108-1 on first surface 102 generate first surface containment electric fields 504-1 and third main portions 110-3 of third electrodes 108-3 on second surface 104 generate second surface containment electric fields 504-2. Since opposing first main portions 110-1 of first electrodes 108-1 and third main portions 110-3 of third electrodes 108-3 receive RF voltages having the same phase but that are phase-shifted with respect to RF voltages received by adjacent second electrodes 108-2 and fourth electrodes 108-4, a region of low electric potential within ion containment space 106 is formed between first surface 102 and second surface 104.

Pairs of opposing main portions 110-2 of second electrodes 108-2 and fourth main portions 110-4 of fourth electrodes 108-4 also generate surface containment electric fields. As shown in FIGS. 5 and 6B, second main portions 110-2 of second electrodes 108-2 on first surface 102 also generate first surface containment electric fields 504-1 and fourth main portions 110-4 of fourth electrodes 108-4 on second surface 104 also generate second surface containment electric fields 504-2. Since opposing second main portions 110-2 of second electrodes 108-2 and fourth main portions 110-4 of fourth electrodes 108-4 receive RF voltages that have the same phase but that are phase-shifted with respected to RF voltages received by adjacent first electrodes 108-1 and third electrodes 108-3, a region of low electric potential is formed within ion containment space 106 between first surface 102 and second surface 104.

First surface containment electric fields 504-1 generated by first main portions 110-1 and second main portions 110-2 on first surface 102 are trapping potentials that inhibit ions 502 from moving toward first surface 102. Second surface containment electric fields 504-2 generated by third main portions 110-3 and fourth main portions 110-4 on second surface 104 are trapping potentials that also inhibit ions 502 from moving toward second surface 104.

At first side 206 and second side 208 of ion containment space 106, opposing edge portions 112 generate edge containment electric fields. As shown in FIG. 6A, at first side 206 of ion containment space 106, first edge portions 112-1 of first electrodes 108-1 on first surface 102 are positioned opposite fourth edge portions 112-4 of fourth electrodes 108-4 on second surface 104. Since first edge portions 112-1 and fourth edge portions 112-4 receive RF voltages that are phase-shifted with respect to one another, first edge containment electric fields 602-1 are generated at first side 206. First edge containment electric fields 602-1 are trapping potentials that inhibit ions 502 from moving toward first side 206 and escaping ion containment space 106 at first side 206.

As shown in FIG. 6B, at second side 208 of ion containment space 106, second edge portions 112-2 of second electrodes 108-2 on first surface 102 are positioned opposite third edge portions 112-3 of third electrodes 108-3 on second surface 104. Since second edge portions 112-2 and third edge portions 112-3 receive RF voltages that are phase-shifted with respect to one another, second edge containment electric fields 602-2 are generated at second side 208. Second edge containment electric fields 602-2 are trapping potentials that inhibit ions 502 from moving toward second side 208 and escaping ion containment space 106 at second side 208.

When ions are introduced into ion containment space 106, first surface containment electric fields 504-1 inhibit movement of ions 502 toward first surface 102 in the +Y direction and second surface containment electric fields 504-2 inhibit movement of ions 502 toward second surface 104 in the −Y direction. First edge containment electric fields 602-1 inhibit movement of ions 502 toward first side 206 in the −X direction and second edge containment electric fields 602-2 inhibit movement of ions 502 toward second side 208 in the +X direction.

With this configuration, electrodes 108 may receive RF voltages and generate surface containment electric fields 504 and edge containment electric fields 602 to contain ions 502 within ion containment space 106. Since first edge containment electric fields 602-1 and second edge containment electric fields 602-2 are RF electric fields, electrodes 108 provide polarity-independent containment of ions 502 within ion containment space 106 along the X axis. Moreover, first edge containment electric fields 602-1 and second edge containment electric fields 602-2 are generated from the same electrodes that generate first surface containment electric fields 504-1 and second surface containment electric fields 504-2, thereby simplifying design and construction of ion guide 100.

In the examples of FIGS. 1-4C, the phases of RF voltages received by edge portions 112 on first surface 102 and second surface 104 have rotational symmetry about the longitudinal axis of ion containment space 106. That is, the phases of RF voltages received by edge portions 112 are the same across the cross-sectional diagonals of ion guide 100. For example, as shown in FIGS. 6A and 6B, first edge portions 112-1 on first surface 102 at first side 206 and third edge portions 112-3 on second surface 104 at second side 208 are configured to receive RF voltages that have the same phase, and second edge portions 112-2 on first surface 102 at second side 208 and fourth edge portions 112-4 on second surface 104 at first side 206 are configured to receive RF voltages that have the same phase but that are phase-shifted with respect to the RF voltages received by first edge portions 112-1 and third edge portions 112-3. By using a rotationally symmetric configuration, the same surface configuration may be used for both first surface 102 and second surface 104. For example, identical PCBs may be used for both first surface 102 and second surface 104, thus facilitating manufacturing of ion guide 100 with low complexity and low cost.

In the examples described above, the rotationally symmetric configuration is achieved by using L-shaped electrodes 108, as described above. However, the rotationally symmetric configuration may be achieved by using other electrode shapes. Examples of alternative electrode shapes will now be described with reference to FIGS. 7 and 8.

Figure 7:
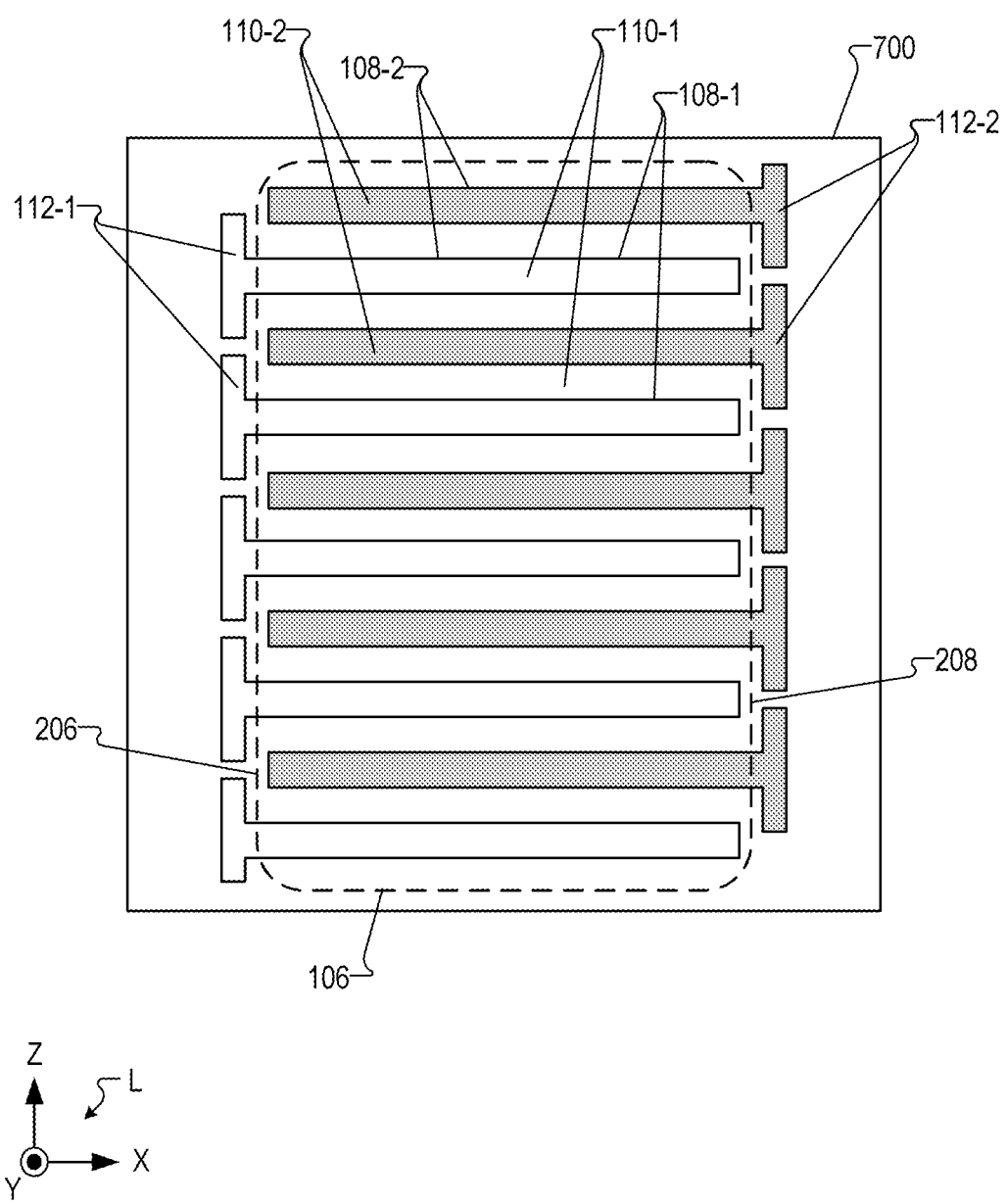
FIGS. 7 and 8 show alternative configurations of electrodes on a surface.

FIG. 7 shows an alternative configuration of electrodes 108 on a surface 700. Surface 700 may implement first surface 102 and/or second surface 104 of ion guide 100. In FIG. 7, each electrode 108 has a T-shape in which each edge portion 112 of the electrode 108 extends beyond the main portion 110 of the electrode 108 in both directions along the longitudinal axis of ion containment space 106. Thus, each edge portion 112 is wider, along the longitudinal direction of ion containment space 106, than main portion 110 of the electrode 108. In some examples, edge portion 112 extends, along the longitudinal axis of ion containment space 106, past at least a part of the main portion 110 of both adjacent electrodes 108. An ion guide may be formed by positioning two surfaces 700 opposite one another with one surface 700 rotated about the longitudinal axis of ion containment space 106 so that opposing main portions receive RF voltages of the same phase and opposing edge portions 112 receive RF voltages that are phase-shifted with respect to one another.

Figure 8:
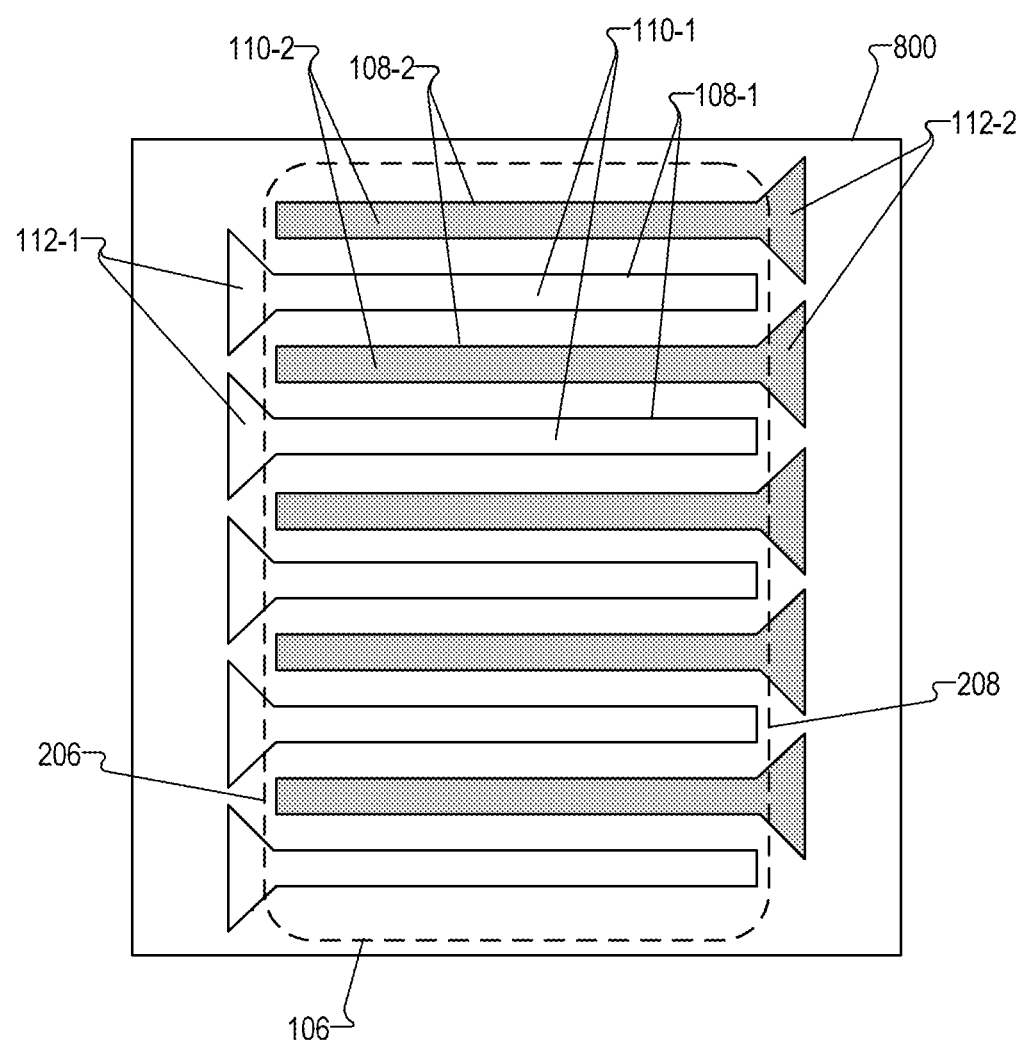

FIG. 8 shows another alternative configuration of electrodes 108 on a surface 800. Surface 800 may implement first surface 102 and/or second surface 104 of ion guide 100. In FIG. 8, each electrode 108 has a Y-shape in which each edge portion 112 of the electrode 108 flares out from main portion 110 (e.g., has a triangular shape) and extends beyond the main portion 110 of the electrode 108 in both directions along the longitudinal axis of ion containment space 106. Thus, each edge portion 112 is wider, along the longitudinal direction of ion containment space 106, than main portion 110 of the electrode 108. In some examples, edge portion 112 extends, along the longitudinal axis of ion containment space 106, past at least a part of the main portion 110 of both adjacent electrodes 108. An ion guide may be formed by positioning two surfaces 800 opposite one another with one surface 800 rotated about the longitudinal axis of ion containment space 106 so that opposing main portions receive RF voltages of the same phase and opposing edge portions 112 receive RF voltages that are phase-shifted with respect to one another.

Figure 9:
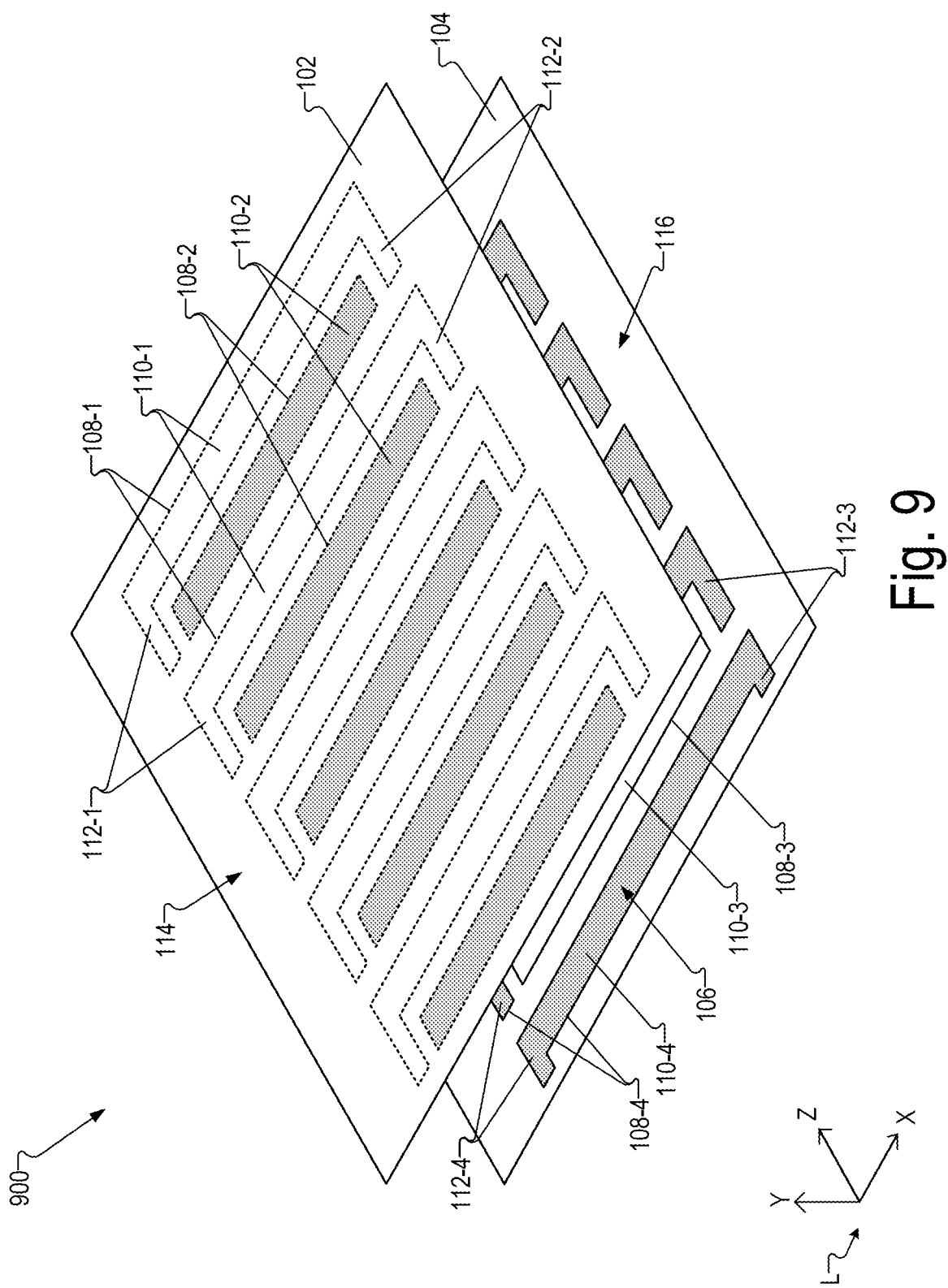
FIG. 9 shows a perspective view of another illustrative ion guide.
Figure 10:
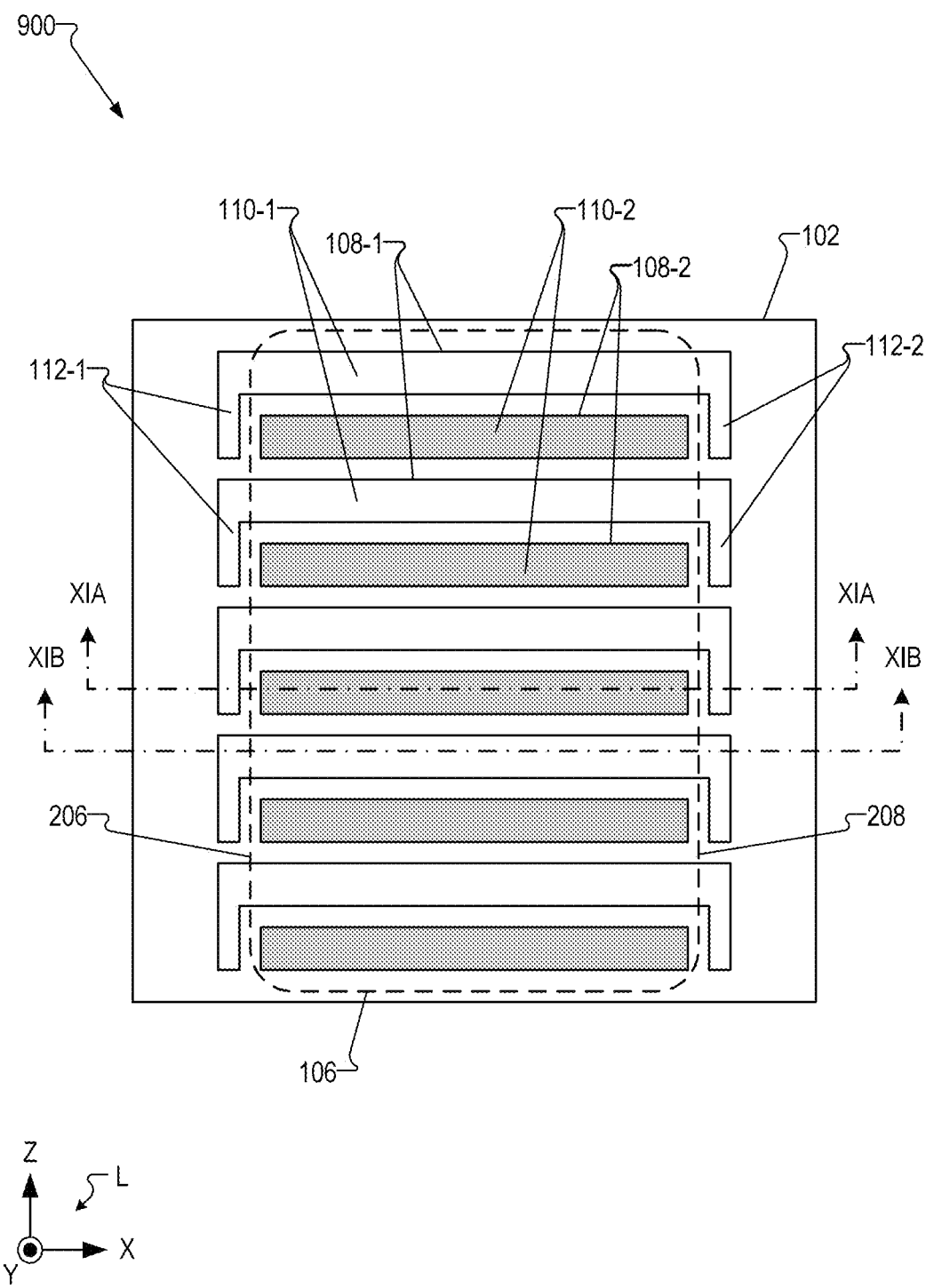
FIG. 10 shows a plan view of the ion guide of FIG. 9.
Figure 11A:
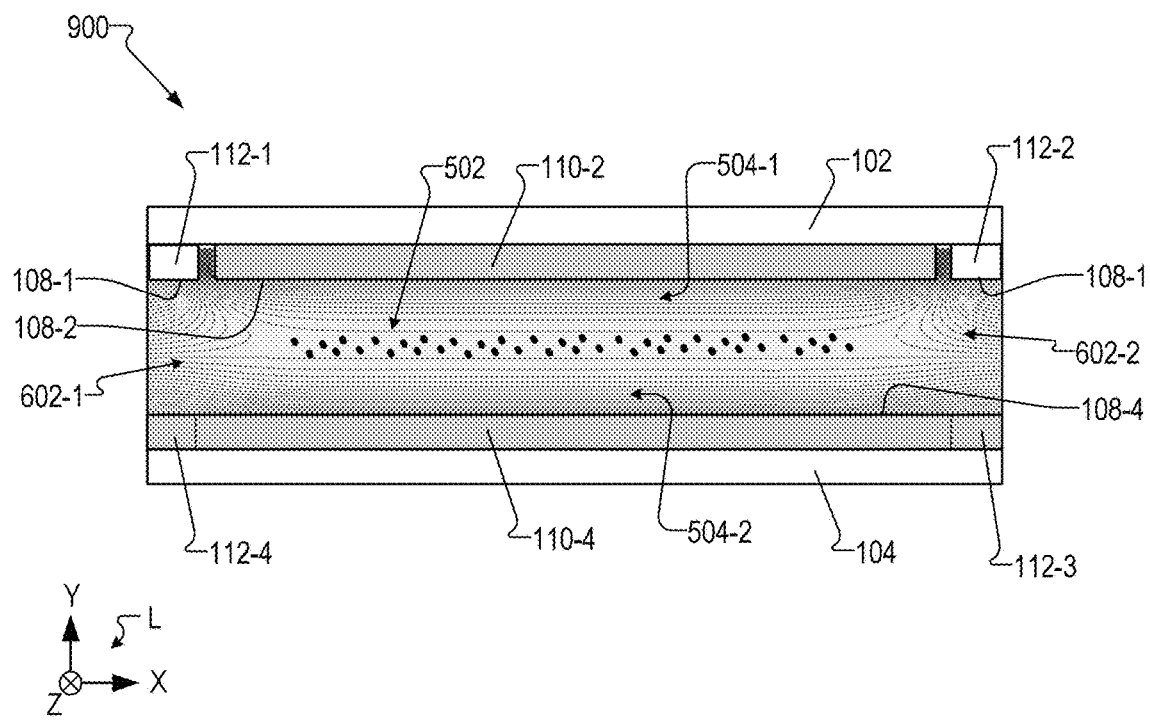
FIGS. 11A and 11B show cross-sectional views of the ion guide of FIGS. 9 and 10 taken along the dash-dot-dash lines labeled XIA and XIB, respectively, in FIG. 10, and equipotential lines of illustrative containment electric fields generated by electrodes of the ion guide when the electrodes receive RF voltages.
Figure 11B:
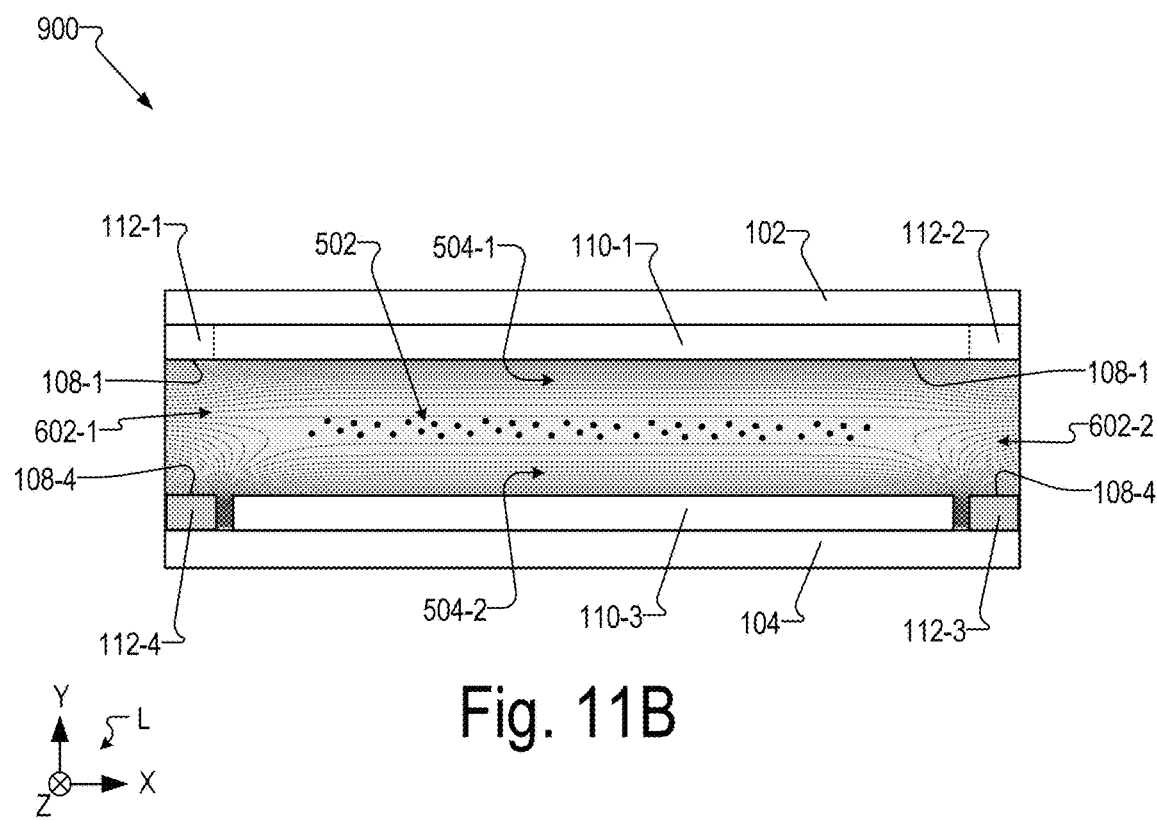

FIGS. 9-11B show various views of another illustrative ion guide 900. FIG. 9 shows a perspective view of ion guide 900. FIG. 10 shows a plan view of ion guide 900. FIGS. 11A and 11B show cross-sectional views of ion guide 900 taken along the dash-dot-dash lines labeled XIA and XIB, respectively, in FIG. 10. Ion guide 900 is similar to ion guide 100 except that, in ion guide 900, the phases of RF voltages received by edge portions 112 on first surface 102 and second surface 104 have X mirror symmetry. That is, the phases of the RF voltages received by edge portions 112 are the same horizontally (along the X axis) across ion guide 900. This mirror symmetry configuration is achieved by a set of electrodes 108 (e.g., first electrodes 108-1) having edge portions 112 on both ends of main portions 110, as will now be explained.

As shown in FIGS. 9 and 10, first arrangement 114 includes first electrodes 108-1 and second electrodes 108-2 alternately arranged on first surface 102. As shown, each first electrode 108-1 includes a first edge portion 112-1 at a first end of first main portion 110-1 (e.g., an end on a –X side corresponding to first side 206 of ion containment space 106) and a second edge portion 112-2 at a second end of first main portion 110-1 (e.g., an end on a +X side corresponding to second side 208 of ion containment space 106). Both first edge portion 112-1 and second edge portion 112-2 are wider than first main portion 110-1 and extend beyond first main portion 110-1 in the same direction along the longitudinal axis of ion containment space 106 (e.g., the –Z direction). Thus, first electrodes 108-1 each have a double L-shape ("LL-shape"). Second electrodes 108-2 have a second main portion 110-2 but do not have any edge portion. In some examples, first edge portion 112-1 and second edge portion 112-2 of a first electrode 108-1 extend, along the longitudinal axis of ion containment space 106, past all or a part of a second main portion 110-2 of an adjacent second electrode 108-2. For example, as shown in FIGS. 9 and 10, second electrodes 108-2 are positioned between first edge portion 112-1 and second edge portion 112-2 of an adjacent first electrode 108-1.

Second arrangement 116 includes third electrodes 108-3 and fourth electrodes 108-4 alternately arranged on second surface 104. As shown, third electrodes 108-3 have a third main portion 110-3 but do not have any edge portion. Each fourth electrode 108-4 includes a fourth edge portion 112-4 at a first end of fourth main portion 110-4 (e.g., an end on a –X side corresponding to first side 206 of ion containment space 106) and a third edge portion 112-3 at a second end of fourth main portion 110-4 (e.g., an end on a +X side corresponding to second side 208 of ion containment space 106). Both third edge portion 112-3 and fourth edge portion 112-4 are wider than fourth main portion 110-4 and extend beyond fourth main portion 110-4 in the same direction along the longitudinal axis of ion containment space 106 (e.g., the –Z direction). Thus, fourth electrodes 108-4 each have a double L-shape ("LL-shape"), similar to first electrodes 108-1. In some examples, third edge portion 112-3 and fourth edge portion 112-4 of a fourth electrode 108-4 extend, along the longitudinal axis of ion containment space 106, past all or a part of a third main portion 110-3 of an adjacent third electrode 108-3. For example, as shown in FIG. 9, third electrodes 108-3 are positioned between third edge portion 112-3 and fourth edge portion 112-4 of an adjacent fourth electrode 108-4.

With the configurations just described first edge portions 112-1 of first electrodes 108-1 are positioned adjacent to one another along the first side 206 of ion containment space 106 and second edge portions 112-2 of first electrodes 108-1 are positioned adjacent to one another along the second side 208 of ion containment space 106. Similarly, third edge portions 112-3 of fourth electrodes 108-4 are positioned adjacent to one another along the second side 208 of ion containment space 106 and fourth edge portions 112-4 of fourth electrodes 108-4 are positioned adjacent to one another along the first side 206 of ion containment space 106.

Electrodes 108 of ion guide 900 are configured to receive RF voltages and generate surface containment electric fields and edge containment electric fields to contain ions within ion containment space 106. In the configurations described above, first electrodes 108-1 and third electrodes 108-3 are configured to receive RF voltages having the same phase and second electrodes 108-2 and fourth electrodes 108-4 are configured to receive RF voltages of the same phase but are phase-shifted with respect to the RF voltages received by first electrodes 108-1 and third electrodes 108-3. In some examples, the RF voltages received by first electrodes 108-1 and third electrodes 108-3 are 180° out of phase with the RF voltages received by second electrodes 108-2 and fourth electrodes 108-4. Accordingly, first arrangement 114 and second arrangement 116 may be positioned opposite one another so that pairs of opposing main portions 110 receive RF voltages having the same phase and pairs of opposing edge portions 112 receive RF voltages that are phase-shifted with respect to one another.

For example, first arrangement 114 is offset from second arrangement 116 along the Z axis so that first main portions 110-1 of LL-shaped first electrodes 108-1 are positioned opposite third main portions 110-3 of LL-shaped third electrodes 108-3, as shown in FIG. 9 and at least in part in FIG. 11A. Similarly, second main portions 110-2 of second electrodes 108-2 are positioned opposite fourth main portions 110-4 of LL-shaped fourth electrodes 108-4, as shown in FIG. 9 and at least in part in FIG. 11B. At first side 206 of ion containment space 106, first edge portions 112-1 of first electrodes 108-1 are positioned opposite fourth edge portions 112-4 of fourth electrodes 108-4, as shown in FIG. 9 and at least in part in FIGS. 11A and 11B. At second side 208 of ion containment space 106, second edge portions 112-2 of first electrodes 108-1 are positioned opposite third edge portions 112-3 of fourth electrodes 108-4, as shown in FIG. 9 and at least in part in FIGS. 11A and 11B.

As shown in FIG. 9, edge portions 112 of LL-shaped electrodes 108 of first arrangement 114 (e.g., first electrodes 108-1) extend in the same direction (e.g., the −Z direction) as edge portions 112 of LL-shaped electrodes 108 of second arrangement 116 (e.g., fourth electrodes 108-4). In alternative configurations, edge portions 112 of LL-shaped electrodes 108 of first arrangement 114 extend, along the Z axis, in an opposite direction (e.g., a +Z direction) than edge portions 112 of LL-shaped electrodes 108 of second arrangement 116 (e.g., fourth electrodes 108-4 in a −Z direction).

As shown in FIG. 9, edge portions 112 of LL-shaped electrodes 108 of first arrangement 114 (e.g., first electrodes 108-1) extend in the same direction (e.g., the −Z When electrodes 108 receive RF voltages, main portions 110 and edge portions 112 of electrodes 108 generate containment electric fields to contain ions 502 within ion containment space 106. For example, pairs of opposing main portions of electrodes 108 receive RF voltages having the same phase and thereby generate first surface containment electric fields 504-1 and second surface containment electric fields 504-2. At first side 206 of ion containment space 106, opposing first edge portions 112-1 and fourth edge portions 112-4 receive RF voltages that are phase-shifted with respect to one another and thereby generate first edge containment electric fields 602-1. At second side 208 of ion containment space 106, opposing second edge portions 112-2 and third edge portions 112-3 receive RF voltages that are phase-shifted with respect to one another and thereby generate second edge containment electric fields 602-2.

In the examples of FIGS. 9-11B, the phases of RF voltages received by edge portions 112 on first surface 102 and second surface 104 have mirror symmetry across ion containment space 106 (e.g., across a YZ plane). That is, the phases of the RF voltages received by edge portions 112 are the same horizontally (along the X axis) across ion guide 900. For example, as shown in FIGS. 11A and 11B, first edge portions 112-1 on first surface 102 at first side 206 and second edge portions 112-2 on first surface 102 at second side 208 are configured to receive RF voltages that have the same phase, and third edge portions 112-3 on second surface 104 at second side 208 and fourth edge portions 112-4 on second surface 104 at first side 206 are configured to receive RF voltages that have the same phase but that are phase-shifted with respect to the RF voltages received by first edge portions 112-1 and second edge portions 112-2.

In the examples described above, the mirror symmetric configuration is achieved by using LL-shaped electrodes 108, as described above. However, the mirror symmetric configuration may be achieved by using other electrode shapes. Examples of alternative electrode shapes will now be described with reference to FIGS. 12-14.

Figure 12:
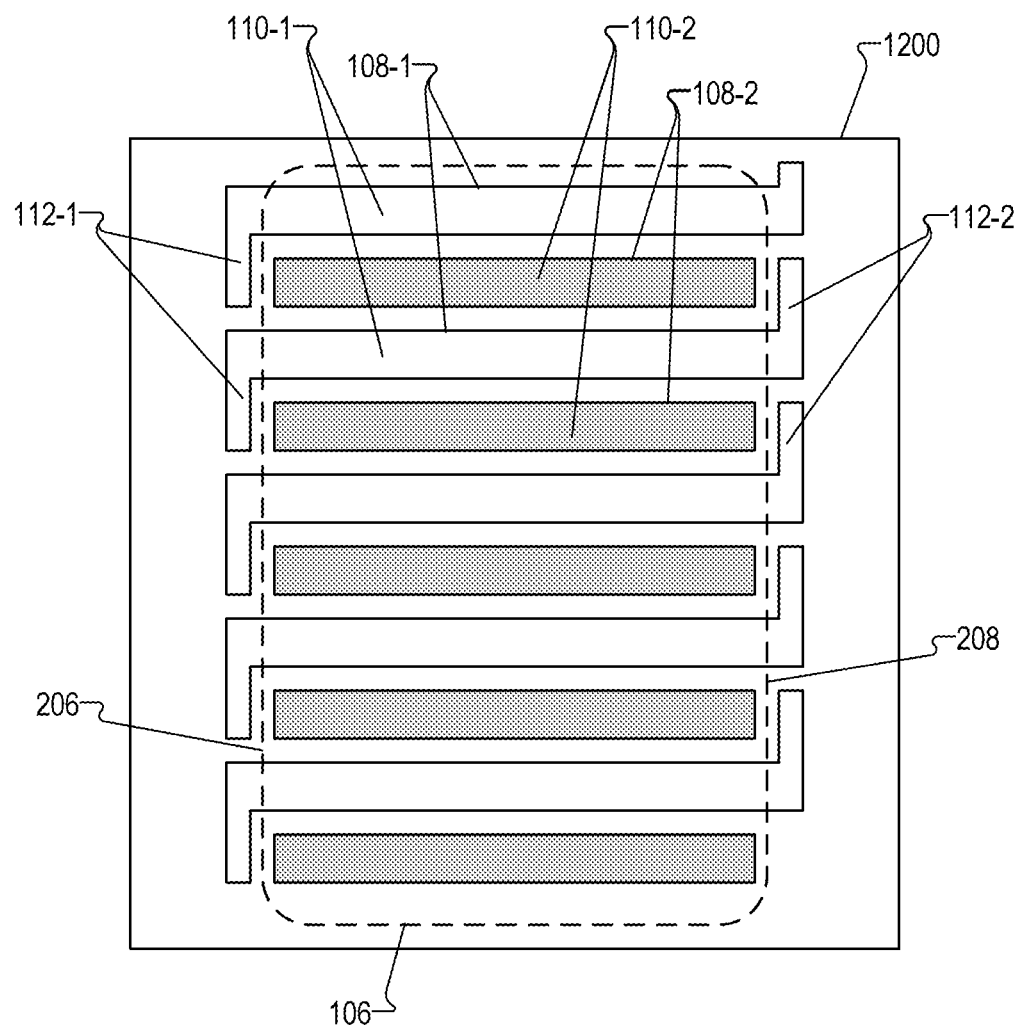
FIGS. 12-14 show alternative configurations of electrodes on a surface.
Figure 12:
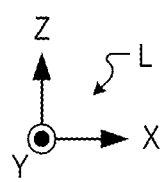

FIG. 12 shows another alternative configuration of electrodes 108 on a surface 1200. Surface 1200 may implement first surface 102 and/or second surface 104 of ion guide 900. In FIG. 12, first edge portion 112-1 and second edge portion 112-2 of the same electrode 108 extend in opposite directions along the Z axis. As shown, first edge portion 112-1 extends in the −Z direction while second edge portion 112-2 extends in the +Z direction. Thus, first electrodes 108-1 each have a double L-shape ("LL-shape") while second electrodes 108-2 do not have any edge portion. In some examples, first edge portion 112-1 extends, along the longitudinal axis of ion containment space 106, past at least a part of a second main portion 110-2 of an adjacent (in the −Z direction) second electrode 108-2. Second edge portion 112-2 of the electrode extends, along the longitudinal axis of ion containment space 106, past at least a part of a second main portion 110-2 of another adjacent (in the +Z direction) second electrode 108-2. An ion guide may be formed by positioning two surfaces 1200 opposite one another with one surface 1200 offset, along the longitudinal axis of ion containment space 106, so that opposing main portions receive RF voltages of the same phase and opposing edge portions 112 receive RF voltages that are phase-shifted with respect to one another.

Figure 13:
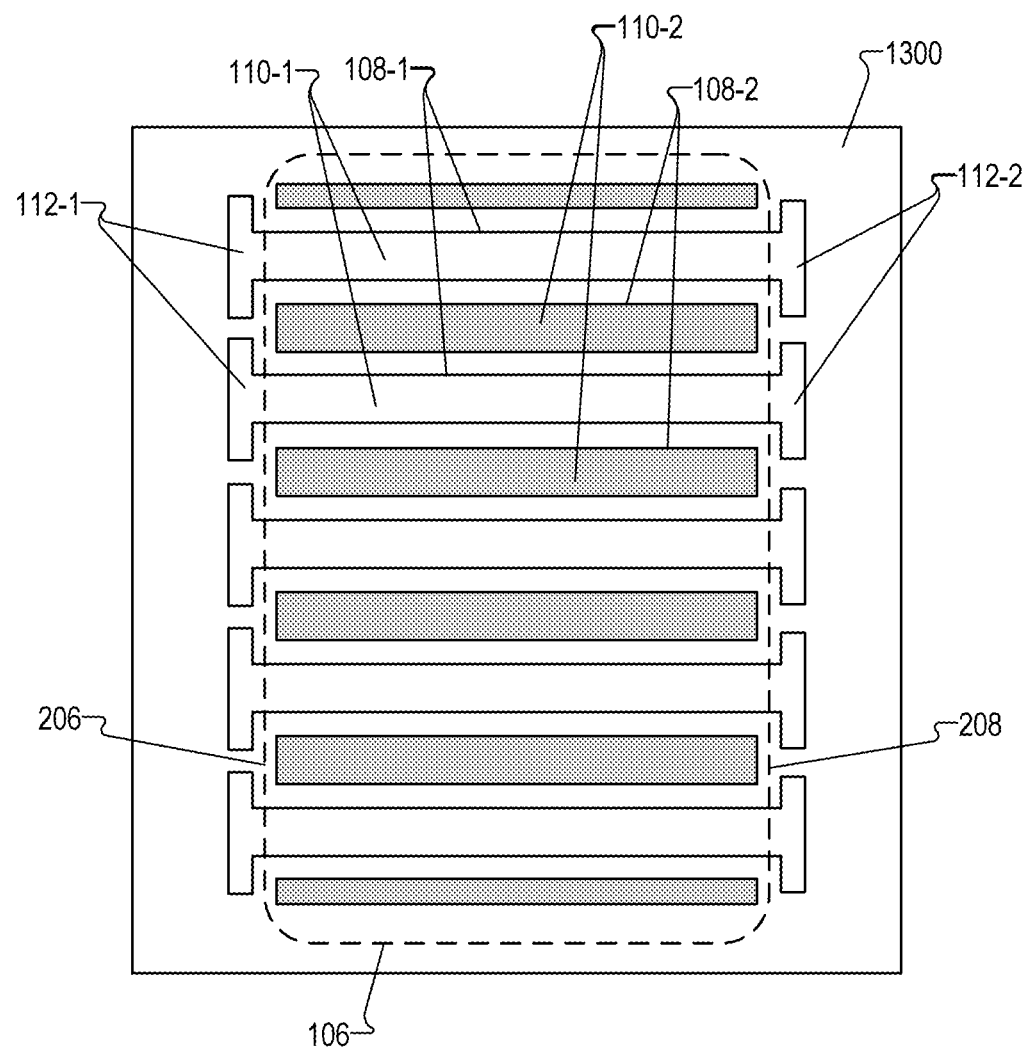
Figure 13:
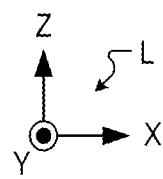

FIG. 13 shows another alternative configuration of electrodes 108 on a surface 1300. Surface 1300 may implement first surface 102 and/or second surface 104 of ion guide 900. In FIG. 13, each first electrode 108-1 includes a first edge portion 112-1 at a first end of first main portion 110-1 (e.g., an end on a −X side corresponding to first side 206 of ion containment space 106) and a second edge portion 112-2 at a second end of first main portion 110-1 (e.g., an end on a +X side corresponding to second side 208 of ion containment space 106). Both first edge portion 112-1 and second edge portion 112-2 extend beyond main portion 110 in both directions along the Z axis (e.g., a +Z direction and a −Z direction). Thus, first electrodes 108-1 each have a double T-shape ("TT-shape") while second electrodes 108-2 do not have any edge portion. First edge portion 112-1 and second edge portion 112-2 extend, along the longitudinal axis of ion containment space 106, past at least a part of second main portions 110-2 of both adjacent second electrodes 108-2. An ion guide may be formed by positioning two surfaces 1300 opposite one another with one surface 1300 offset, along the longitudinal axis of ion containment space 106, so that opposing main portions receive RF voltages of the same phase and opposing edge portions 112 receive RF voltages that are phase-shifted with respect to one another.

Figure 14:
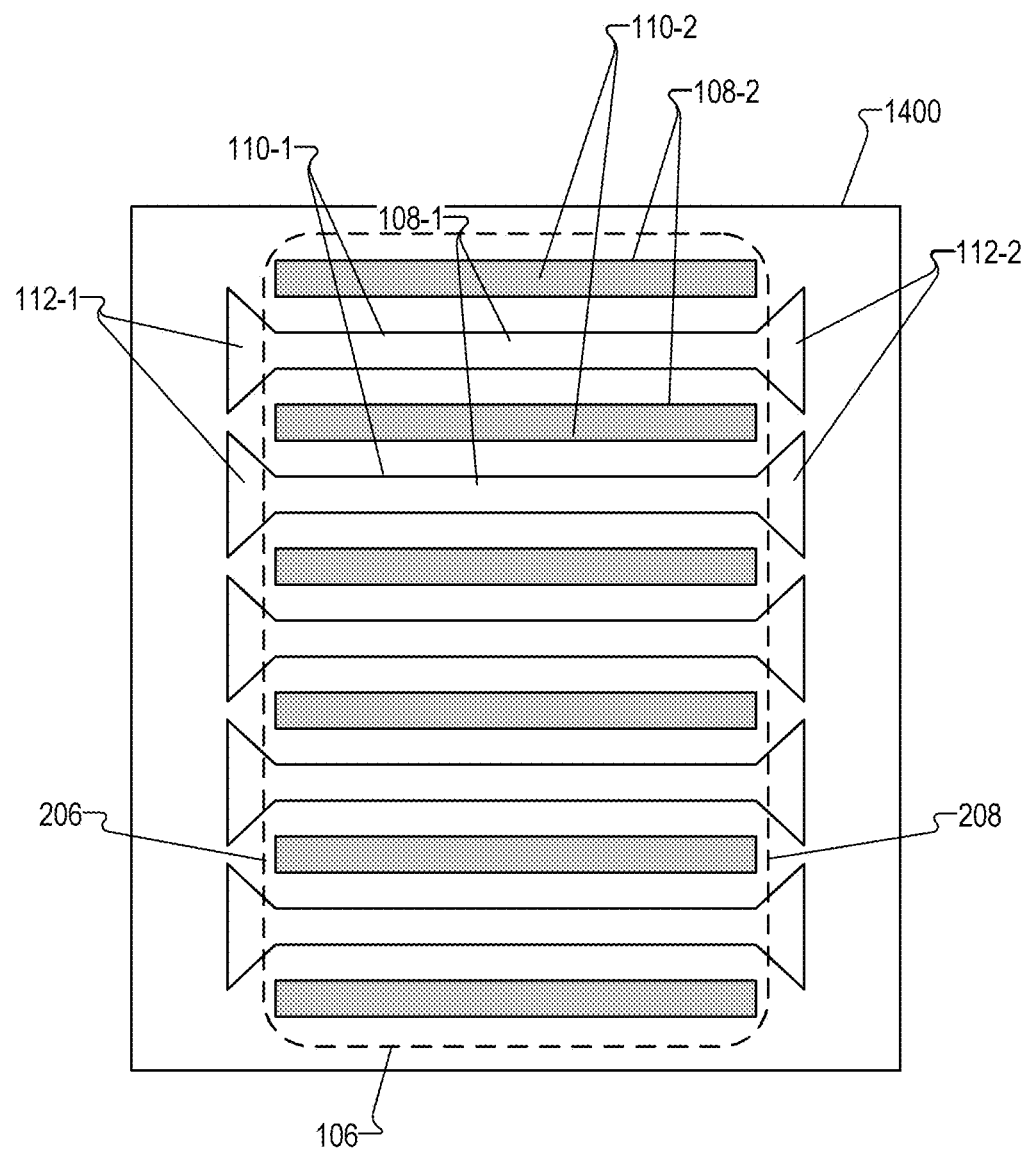
Figure 14:
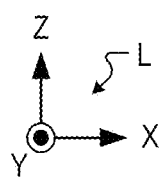

FIG. 14 shows another alternative configuration of electrodes 108 on a surface 1400. Surface 1400 may implement first surface 102 and/or second surface 104 of ion guide 900. In FIG. 13, each first electrode 108-1 includes a first edge portion 112-1 at a first end of first main portion 110-1 (e.g., an end on a −X side corresponding to first side 206 of ion containment space 106) and a second edge portion 112-2 at a second end of first main portion 110-1 (e.g., an end on a +X side corresponding to second side 208 of ion containment space 106). Both first edge portion 112-1 and second edge portion 112-2 extend beyond main portion 110 in both directions along the Z axis (e.g., a +Z direction and a −Z direction). Thus, first electrodes 108-1 each have a double T-shape ("TT-shape") while second electrodes 108-2 do not have any edge portion. First edge portion 112-1 and second edge portion 112-2 extend, along the longitudinal axis of ion containment space 106, past at least a part of second main portions 110-2 of both adjacent second electrodes 108-2. An ion guide may be formed by positioning two surfaces 1300 opposite one another with one surface 1300 offset, along the longitudinal axis of ion containment space 106, so that opposing main portions receive RF voltages of the same phase and opposing edge portions 112 receive RF voltages that are phase-shifted with respect to one another.

Various modifications may be made to the apparatuses described herein. In some examples, first arrangement 114 and second arrangement 116 are offset from one another along the longitudinal axis of ion containment space 106 so that main portions 110 of electrodes 108 that receive the same phase of RF voltages are not positioned directly opposite one another. For example, opposing main portions 110 may receive RF voltages that are phase-shifted with respect to one another. Accordingly, first main portions 110-1 may be positioned opposite fourth main portions 110-4 and second main portions 110-2 may be positioned opposite third main portions 110-3. In other configurations, first arrangement 114 and second arrangement 116 are offset from one another along the longitudinal axis of ion containment space 106 so that first main portions 110-1 and second main portions 110-2 are partially or entirely positioned opposite gaps between adjacent third main portions 110-3 and fourth main portions 110-4. Likewise, third main portions 110-3 and fourth main portions 110-4 are partially or entirely positioned opposite gaps between adjacent first main portions 110-1 and second main portions 110-2. Because of the shape of edge portions 112 of electrodes 108, the offset configuration of first arrangement 114 and second arrangement 116 does not alter the phases of RF voltages received by opposing edge portions 112 or the edge containment electric fields.

In some examples, first arrangement 114 on first surface 102 is different from second arrangement 116 on second surface 104. For example, first arrangement 114 may have the configuration shown in FIG. 2 and second arrangement 116 may have the configuration shown in FIG. 7 or 8. As another example, first arrangement 114 may have the configuration shown in any one of FIGS. 10 and 12-14 and second arrangement 116 may have any configuration shown in any other of FIGS. 10 and 12-14.

In some embodiments, first arrangement 114 and/or second arrangement 116 includes a combination of different electrode shapes. For example, first arrangement 114 and/or second arrangement 116 may include any combination of L-shaped electrodes 108, T-shaped electrodes 108, and Y-shaped electrodes 108. As another example, first arrangement 114 and/or second arrangement 116 may include any combination of LL-shaped electrodes 108, TT-shaped electrodes 108, and YY-shaped electrodes 108.

In the examples described above, edge portions 112 are rectangular (L-shaped or T-shaped electrodes) or triangular (Y-shaped electrodes). However, edge portions 112 may have any other shape as may suit a particular implementation (e.g., rounded, oval, irregular, etc.).

In the examples described above, edge portions 112 are formed integrally with main portions 110. In other embodiments, edge portions 112 and main portions 110 are formed separately but are electrically connected (e.g., by a via, a trace, a wire, a relay, etc.) to receive the same RF voltages.

In the examples described above, electrodes 108 are arranged to form a linear (straight) ion path. In other embodiments, electrodes 108 are arranged to form a non-linear ion path. For example, the ion path may include one or more bends, turns, curves, and/or angles. Moreover, the ion guides described herein may include multiple ion paths and one or more junctions or intersections with other ion paths.

Figure 15:
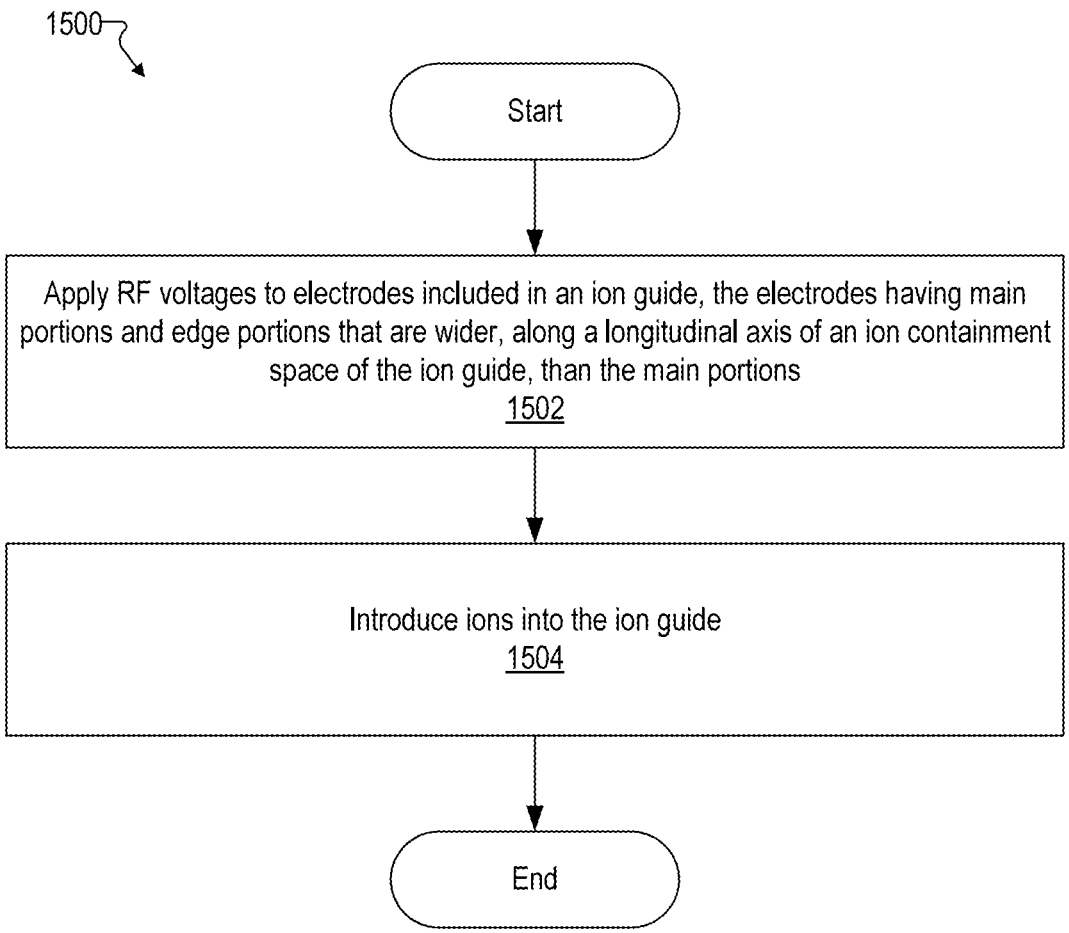
FIG. 15 shows a flowchart of an illustrative method of guiding ions.

FIG. 15 shows a flowchart of an illustrative method 1500 of guiding ions. While FIG. 15 shows illustrative operations according to one embodiment, other embodiments may omit, add to, reorder, and/or modify one or more operations of the method 1500 depicted in FIG. 15. Each operation of method 1500 depicted in FIG. 15 may be performed in any manner described herein.

At operation 1502, RF voltages are applied to a electrodes included in an ion guide configured as described herein (e.g., ion guide 100 or ion guide 900). For example, the ion guide includes a first surface and a second surface positioned opposite the first surface and a plurality of electrodes comprising a first arrangement of electrodes on the first surface and a second arrangement of electrodes on the second surface, the first arrangement of electrodes and the second arrangement of electrodes positioned opposite one another and defining an ion containment space therebetween. The plurality of electrodes are configured as described herein. For example, electrodes included in the plurality of electrodes have main portions and edge portions that are wider than the main portions.

At operation 1504, ions are introduced into the ion guide. When the plurality of electrodes receive the RF voltages, the plurality of electrodes generate surface containment electric fields and edge containment electric fields that provide polarity-independent containment of the ions within the ion containment space along a first axis (e.g., a Y axis) and along a second axis (e.g., an X axis) that are perpendicular to a longitudinal axis (e.g., a Z axis) of the ion guide.

Figure 16:
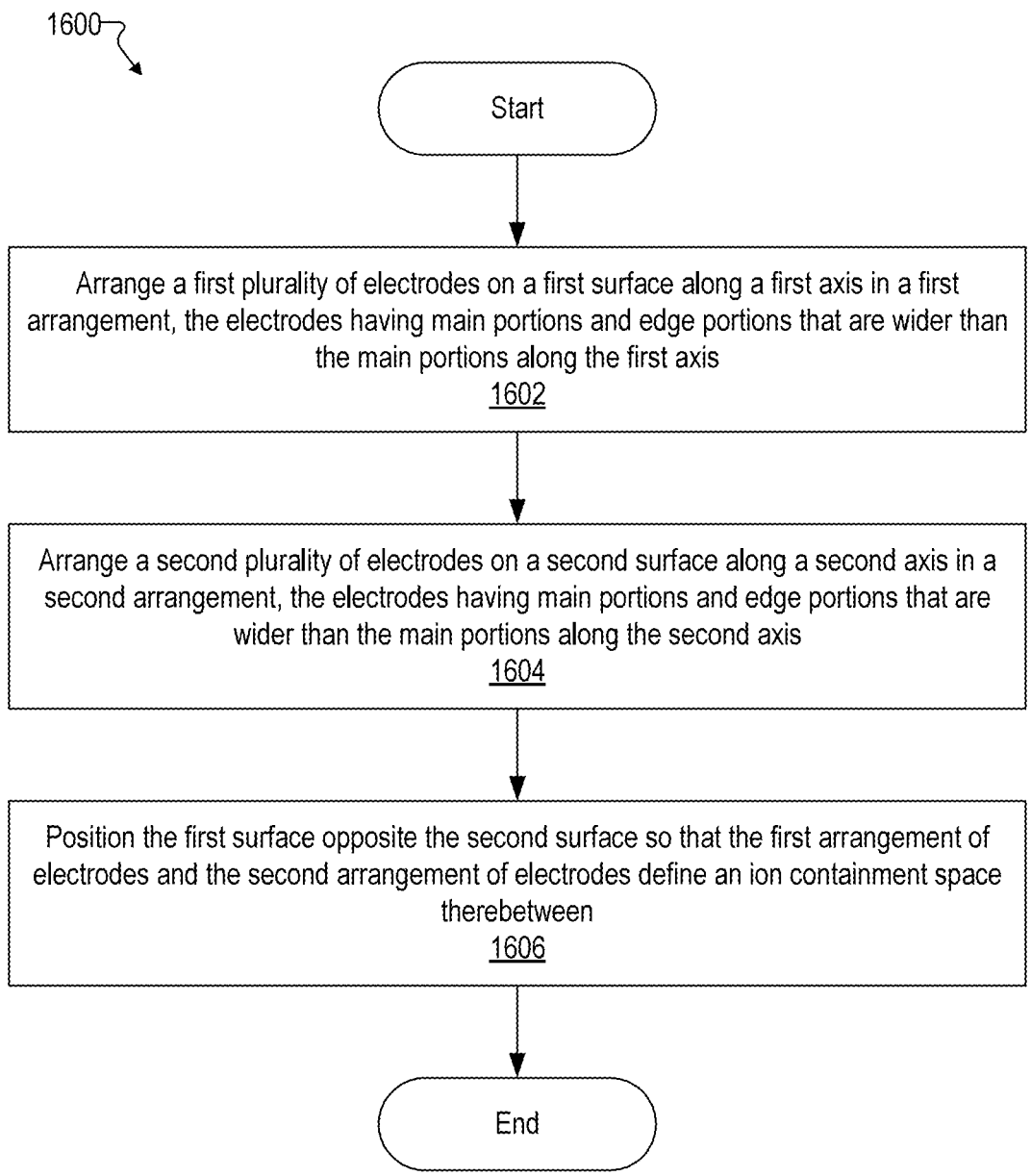
FIG. 16 shows a flowchart of an illustrative method of making an ion guide.

FIG. 16 shows a flowchart of an illustrative method 1600 of making an ion guide (e.g., ion guide 100 or ion guide 900). While FIG. 16 shows illustrative operations according to one embodiment, other embodiments may omit, add to, reorder, and/or modify one or more operations of the method 1600 depicted in FIG. 16. Each operation of method 1600 depicted in FIG. 16 may be performed in any manner described herein.

At operation 1602, a first plurality of electrodes are arranged along a first axis (e.g., a Z axis) in a first arrangement (e.g., first arrangement 114) on a first surface (e.g., first surface 102). The plurality of electrodes are arranged as described herein. Electrodes included in the first plurality of electrodes include a main portion and an edge portion that is wider than the main portion along the first axis. In some examples, the electrodes have an L-shape, a T-shape, a Y-shape, an LL-shape, a TT-shape, or a YY-shape.

At operation 1604, a second plurality of electrodes are arranged along a second axis (e.g., the Z axis) in a second arrangement (e.g., second arrangement 116) on a second surface (e.g., second surface 104). The second plurality of electrodes are arranged as described herein. Electrodes included in the second plurality of electrodes include a main portion and an edge portion that is wider than the main portion along the second axis. In some examples, the electrodes have an L-shape, a T-shape, a Y-shape, an LL-shape, a TT-shape, or a YY-shape At operation 1606, the first surface is positioned opposite the second surface so that the first arrangement of electrodes and the second arrangement of electrodes define an ion containment space therebetween. The first axis and the second axis extend along a longitudinal axis of the ion containment space.

It will be recognized by those of ordinary skill in the art that while, in the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

Advantages and features of the present disclosure can be further described by the following examples:

Example 1. An ion guide comprising: a first surface and a second surface facing one another with a gap therebetween; and a plurality of electrodes comprising a first arrangement of electrodes on the first surface and a second arrangement of electrodes on the second surface, the first arrangement of electrodes and the second arrangement of electrodes positioned opposite one another and defining an ion containment space in the gap, wherein: the first arrangement of electrodes comprises first electrodes and second electrodes arranged on the first surface along a longitudinal axis of the ion containment space; each first electrode comprises: a first main portion extending from a first side of the ion containment space to a second side of the ion containment space; and a first edge portion at the first side of the ion containment space, the first edge portion being wider, along the longitudinal axis of the ion containment space, than the first main portion; the second arrangement of electrodes comprises third electrodes and fourth electrodes arranged on the second surface along the longitudinal axis of the ion containment space; each fourth electrode comprises: a fourth main portion extending from the first side of the ion containment space to the second side of the ion containment space; and a fourth edge portion at the first side of the ion containment space, the fourth edge portion being wider, along the longitudinal axis of the ion containment space, than the fourth main portion; the first edge portions of the first electrodes are positioned opposite the fourth edge portions of the fourth electrodes; and the first electrodes and the third electrodes are configured to receive first RF voltages and the second electrodes and the fourth electrodes are configured to receive second RF voltages that are phase-shifted with respect to the first RF voltages.

Example 2. The ion guide of example 1, wherein the first electrodes and the second electrodes have an L-shape, a T-shape, or a Y-shape.

Example 3. The ion guide of example 1, wherein: each third electrode comprises a third main portion; and the first main portions of the first electrodes are positioned opposite the third main portions of the third electrodes.

Example 4. The ion guide of example 1, wherein the first main portions of the first electrodes are positioned opposite the fourth main portions of the fourth electrodes.

Example 5. The ion guide of example 1, wherein: each second electrode comprises a second main portion; each third electrode comprises a third main portion; and the first main portions of the first electrodes and the second main portions of the second electrodes are positioned opposite gaps between the third main portions of the third electrodes and the fourth main portions of the fourth electrodes.

Example 6. The ion guide of example 1, wherein: each second electrode comprises: a second main portion extending from the first side of the ion containment space to the second side of the ion containment space; and a second edge portion at the second side of the ion containment space, the second edge portion being wider, along the longitudinal axis of the ion containment space, than the second main portion; each third electrode comprises: a third main portion extending from the first side of the ion containment space to the second side of the ion containment space; and a third edge portion at the second side of the ion containment space, the third edge portion being wider, along the longitudinal axis of the ion containment space, than the third main portion; the second edge portions of the second electrodes are positioned opposite the third edge portions of the third electrodes.

Example 7. The ion guide of example 6, wherein the second electrodes and the third electrodes have an L-shape, a T-shape, or a Y-shape.

Example 8. The ion guide of example 6, wherein the second main portions of the second electrodes are positioned opposite the fourth main portions of the fourth electrodes.

Example 9. The ion guide of example 6, wherein the second main portions of the second electrodes are positioned opposite the third main portions of the third electrodes.

Example 10. The ion guide of example 6, wherein the first main portions of the first electrodes and the second main portions of the second electrodes are positioned opposite gaps between the third main portions of the third electrodes and the fourth main portions of the fourth electrodes.

Example 11. The ion guide of example 1, wherein: each first electrode further comprises a second edge portion at the second side of the ion containment space, the second edge portion being wider, along the longitudinal axis of the ion containment space, than the first main portion; each fourth electrode further comprises a third edge portion at the second side of the ion containment space, the third edge portion being wider, along the longitudinal axis of the ion containment space, than the fourth main portion; and the second edge portions of the first electrodes are positioned opposite the third edge portions of the fourth electrodes.

Example 12. The ion guide of example 11, wherein the first electrodes and the fourth electrodes have an LL-shape, a TT-shape, or a YY-shape.

Example 13. The ion guide of example 11, wherein the first edge portions and the second edge portions extend in opposite directions along the longitudinal axis of the ion containment space.

Example 14. The ion guide of example 11, wherein: each second electrode comprises a second main portion; each third electrode comprises a third main portion; the first main portions of the first electrodes are positioned opposite the third main portions of the third electrodes; and the second main portions of the second electrodes are positioned opposite the fourth main portions of the fourth electrodes.

Example 15. The ion guide of example 11, wherein: each second electrode comprises a second main portion; each third electrode comprises a third main portion; the first main portions of the first electrodes are positioned opposite the fourth main portions of the fourth electrodes; and the second main portions of the second electrodes are positioned opposite the third main portions of the third electrodes.

Example 16. The ion guide of example 11, wherein: each second electrode comprises a second main portion; each third electrode comprises a third main portion; and the first main portions of the first electrodes and the second main portions of the second electrodes are positioned opposite gaps between the third main portions of the third electrodes and the fourth main portions of the fourth electrodes.

Example 17. The ion guide of example 1, wherein the first edge portion of a first electrode extends, along the longitudinal axis of the ion containment space, all or a part of the second main portion of an adjacent second electrode.

Example 18. The ion guide of example 17, wherein the fourth edge portion of a fourth electrode extends, along the longitudinal axis of the ion containment space, past all or a part of the third main portion of an adjacent third electrode.

Example 19. The ion guide of example 1, wherein one or both of the first surface and the second surface comprises a printed circuit board (PCB).

Example 20. A method of guiding ions, comprising: introducing ions into an ion guide comprising a first surface and a second surface facing one another with a gap therebetween and a plurality of electrodes comprising a first arrangement of electrodes on the first surface and a second arrangement of electrodes on the second surface, the first arrangement of electrodes and the second arrangement of electrodes positioned opposite one another and defining an ion containment space in the gap, wherein: the first arrangement of electrodes comprises first electrodes and second electrodes arranged on the first surface along a longitudinal axis of the ion containment space; each first electrode comprises: a first main portion extending from a first side of the ion containment space to a second side of the ion containment space; and a first edge portion at the first side of the ion containment space, the first edge portion being wider, along the longitudinal axis of the ion containment space, than the first main portion; the second arrangement of electrodes comprises third electrodes and fourth electrodes alternately arranged on the second surface along the longitudinal axis of the ion containment space; each fourth electrode comprises: a fourth main portion extending from the first side of the ion containment space to the second side of the ion containment space; and a fourth edge portion at the first side of the ion containment space, the fourth edge portion being wider, along the longitudinal axis of the ion containment space, than the fourth main portion; and the first edge portions of the first electrodes are positioned opposite the fourth edge portions of the fourth electrodes; and applying RF voltages to the plurality of electrodes, the first electrodes and the third electrodes receiving first RF voltages and the second electrodes and the fourth electrodes receiving second RF voltages that are phase-shifted with respect to the first RF voltages.

Example 21. The method of example 20, further comprising driving the ions along the longitudinal axis of the ion containment space.

Example 22. The method of example 21, wherein the driving the ions along the longitudinal axis of the ion containment space comprises passing a carrier gas through the ion containment space.

Example 23. The method of example 21, wherein the driving the ions along the longitudinal axis of the ion containment space comprises applying to a DC voltage to the plurality of electrodes to generate a DC gradient field or a DC traveling wave.

Example 24. The method of example 21, wherein the RF voltages are configured to drive the ions along the longitudinal axis of the ion containment space.

Example 25. The method of example 20, further comprising trapping the ions in the ion containment space.

Example 26. An ion guide comprising: a first surface and a second surface facing one another with a gap therebetween; and a plurality of electrodes comprising a first arrangement of electrodes on the first surface and a second arrangement of electrodes on the second surface, the first arrangement of electrodes and the second arrangement of electrodes positioned opposite one another and defining an ion containment space in the gap, wherein: the first arrangement of electrodes comprises first electrodes and second electrodes alternately arranged on the first surface along a longitudinal axis of the ion containment space; the second arrangement of electrodes comprises third electrodes and fourth electrodes alternately arranged on the second surface along the longitudinal axis of the ion containment space; the first electrodes and the third electrodes are configured to receive RF voltages of a same phase; the second electrodes and the fourth electrodes are configured to receive RF voltages having a same phase and that are phase shifted with respect to the RF voltages received by the first electrodes and the third electrodes; main portions of the first electrodes and the third electrodes and main portions of the second electrodes and the fourth electrodes are configured to generate surface containment electric fields that inhibit movement of the ions within the ion containment space toward the first surface and the second surface; and opposing edge portions of the first electrodes and the fourth electrodes are configured to receive RF voltages that are phase-shifted with respect to one another and generate a first edge containment electric field that inhibit movement of the ions within the ion containment space toward a first side of the ion containment space.

Example 27. The ion guide of example 26, wherein opposing edge portions of the second electrodes and the third electrodes are configured to receive RF voltages that are phase-shifted with respect to one another and generate a second edge containment electric field that inhibits movement of the ions within the ion containment space toward a second side of the ion containment space.

Example 28. The ion guide of example 26, wherein additional opposing edge portions of the first electrodes and the fourth electrodes generate a second edge containment electric field that inhibit movement of the ions within the ion containment space toward a second side of the ion containment space.

Example 29. The ion guide of example 26, wherein: each first electrode extends, along the longitudinal axis of the ion containment space, to an adjacent second electrode; and each fourth electrode extends, along the longitudinal axis of the ion containment space, to an adjacent third electrode.

Example 30. The ion guide of example 26, wherein the first electrodes and the fourth electrodes have an L-shape, a T-shape, or a Y-shape.

Example 31. The ion guide of example 26, wherein the first electrodes and the fourth electrodes have an LL-shape, a TT-shape, or a YY-shape.

Example 32. An ion guide comprising; a first surface and a second surface facing one another with a gap therebetween; a plurality of electrodes comprising a first arrangement of electrodes on the first surface and a second arrangement of electrodes on the second surface; and an ion containment space in the gap between the first arrangement of electrodes and the second arrangement of electrodes; wherein: the first arrangement of electrodes comprises first electrodes and second electrodes arranged on the first surface along a longitudinal axis of the ion containment space; the second arrangement of electrodes comprises third electrodes and fourth electrodes arranged on the second surface along the longitudinal axis of the ion containment space; first main portions of the first electrodes are positioned opposite third main portions of the third electrodes or fourth main portions of the fourth electrodes; second main portions of the second electrodes are positioned opposite the other of the third main portions of the third electrodes or the fourth main portions of the fourth electrodes; first edge portions of the first electrodes are positioned opposite fourth edge portions of the fourth electrodes at a first side of the ion containment space; the first electrodes and the third electrodes are configured to receive RF voltages; and the second electrodes and the fourth electrodes are configured to receive RF voltages that are phase-shifted with respect to the RF voltages received by the first electrodes and the third electrodes.

Example 33. The ion guide of example 32, wherein second edge portions of the second electrodes are positioned opposite third edge portions of the third electrodes at a second side of the ion containment space.

Example 34. The ion guide of example 32, wherein second edge portions of the first electrodes are positioned opposite third edge portions of the fourth electrodes at a second side of the ion containment space.

Example 35. A method of making an ion guide, comprising: arranging first electrodes and second electrodes on a first surface in a first arrangement of electrodes; arranging third electrodes and fourth electrodes on a second surface in a second arrangement of electrodes; and positioning the first surface facing the second surface with a gap therebetween so that the first arrangement of electrodes and the second arrangement of electrodes define an ion containment space in the gap, wherein the first arrangement of electrodes and the second arrangement of electrodes are positioned so that: first main portions of the first electrodes are positioned opposite third main portions of the third electrodes or fourth main portions of the fourth electrodes; second main portions of the second electrodes are positioned opposite the other of the third main portions of the third electrodes or the fourth main portions of the fourth electrodes; and first edge portions of the first electrodes are positioned opposite fourth edge portions of the fourth electrodes at a first side of the ion containment space; connecting the first electrodes and the third electrodes to a first circuit configured to receive RF voltages; and connecting the second electrodes and the fourth electrodes to a second circuit configured to receive RF voltages that are phase-shifted with respect to the RF voltages received by the first circuit.

Example 36. The method of example 35, wherein the first arrangement of electrodes and the second arrangement of electrodes are further positioned so that second edge portions of the second electrodes are positioned opposite third edge portions of the third electrodes at a second side of the ion containment space.

Example 37. The method of example 35, wherein the first arrangement of electrodes and the second arrangement of electrodes are further positioned so that second edge portions of the first electrodes are positioned opposite third edge portions of the fourth electrodes at a second side of the ion containment space.

Example 38. An ion guide comprising: a plurality of electrodes arranged on opposing surfaces and defining an ion containment space in a gap between the opposing surfaces, wherein: each electrode of the plurality of electrodes comprises an elongate main portion and an edge portion at an end of the main portion, the edge portion being wider, along a longitudinal axis of the ion containment space, than the main portion; the plurality of electrodes are configured to receive RF voltages; and the plurality of electrodes are arranged so that opposing edge portions receive RF voltages that are phase-shifted with respect to one another.

Example 39. The ion guide of example 38, wherein the plurality of electrodes are arranged so that opposing main portions receive RF voltages of a same phase.

Example 40. The ion guide of example 38, wherein the plurality of electrodes are arranged so that opposing main portions do not receive RF voltages of a same phase.

What is claimed is:

1. An ion guide comprising:
    a first surface and a second surface facing one another with a gap therebetween; and
    a plurality of electrodes comprising a first arrangement of electrodes on the first surface and a second arrangement of electrodes on the second surface, the first arrangement of electrodes and the second arrangement of electrodes positioned opposite one another and defining an ion containment space in the gap, wherein:
      the first arrangement of electrodes comprises first electrodes and second electrodes arranged on the first surface along a longitudinal axis of the ion containment space;
      each first electrode comprises:
        a first main portion extending from a first side of the ion containment space to a second side of the ion containment space; and
        a first edge portion at the first side of the ion containment space, the first edge portion being wider, along the longitudinal axis of the ion containment space, than the first main portion;
      the second arrangement of electrodes comprises third electrodes and fourth electrodes arranged on the second surface along the longitudinal axis of the ion containment space;
      each fourth electrode comprises:
        a fourth main portion extending from the first side of the ion containment space to the second side of the ion containment space; and
        a fourth edge portion at the first side of the ion containment space, the fourth edge portion being wider, along the longitudinal axis of the ion containment space, than the fourth main portion;
      the first edge portions of the first electrodes are positioned opposite the fourth edge portions of the fourth electrodes; and the first electrodes and the third electrodes are configured to receive first RF voltages and the second electrodes and the fourth electrodes are configured to receive second RF voltages that are phase-shifted with respect to the first RF voltages.

2. The ion guide of claim 1, wherein the first electrodes and the second electrodes have an L-shape, a T-shape, or a Y-shape.

3. The ion guide of claim 1, wherein:
each third electrode comprises a third main portion; and
the first main portions of the first electrodes are positioned opposite the third main portions of the third electrodes.

4. The ion guide of claim 1, wherein the first main portions of the first electrodes are positioned opposite the fourth main portions of the fourth electrodes.

5. The ion guide of claim 1, wherein:
each second electrode comprises a second main portion;
each third electrode comprises a third main portion; and
the first main portions of the first electrodes and the second main portions of the second electrodes are positioned opposite gaps between the third main portions of the third electrodes and the fourth main portions of the fourth electrodes.

6. The ion guide of claim 1, wherein:
each second electrode comprises:
a second main portion extending from the first side of the ion containment space to the second side of the ion containment space; and
a second edge portion at the second side of the ion containment space, the second edge portion being wider, along the longitudinal axis of the ion containment space, than the second main portion;
each third electrode comprises:
a third main portion extending from the first side of the ion containment space to the second side of the ion containment space; and
a third edge portion at the second side of the ion containment space, the third edge portion being wider, along the longitudinal axis of the ion containment space, than the third main portion;
the second edge portions of the second electrodes are positioned opposite the third edge portions of the third electrodes.

7. The ion guide of claim 6, wherein the second electrodes and the third electrodes have an L-shape, a T-shape, or a Y-shape.

8. The ion guide of claim 1, wherein:
each first electrode further comprises a second edge portion at the second side of the ion containment space, the second edge portion being wider, along the longitudinal axis of the ion containment space, than the first main portion;
each fourth electrode further comprises a third edge portion at the second side of the ion containment space, the third edge portion being wider, along the longitudinal axis of the ion containment space, than the fourth main portion; and
the second edge portions of the first electrodes are positioned opposite the third edge portions of the fourth electrodes.

9. The ion guide of claim 8, wherein the first electrodes and the fourth electrodes have an LL-shape, a TT-shape, or a YY-shape.

10. The ion guide of claim 1, wherein:
each second electrode comprises a second main portion; and
the first edge portion of a first electrode extends, along the longitudinal axis of the ion containment space, past all or a part of the second main portion of an adjacent second electrode.

11. The ion guide of claim 10, wherein:
each third electrode comprises a third main portion; and
the fourth edge portion of a fourth electrode extends, along the longitudinal axis of the ion containment space, past all or a part of the third main portion of an adjacent third electrode.

12. The ion guide of claim 1, wherein one or both of the first surface and the second surface comprises a printed circuit board (PCB).

13. An ion guide comprising:
a first surface and a second surface facing one another with a gap therebetween; and
a plurality of electrodes comprising a first arrangement of electrodes on the first surface and a second arrangement of electrodes on the second surface, the first arrangement of electrodes and the second arrangement of electrodes positioned opposite one another and defining an ion containment space in the gap, wherein:
the first arrangement of electrodes comprises first electrodes and second electrodes alternately arranged on the first surface along a longitudinal axis of the ion containment space;
the second arrangement of electrodes comprises third electrodes and fourth electrodes alternately arranged on the second surface along the longitudinal axis of the ion containment space;
the first electrodes and the third electrodes are configured to receive RF voltages of a same phase;
the second electrodes and the fourth electrodes are configured to receive RF voltages having a same phase and that are phase shifted with respect to the RF voltages received by the first electrodes and the third electrodes;
main portions of the first electrodes and the third electrodes and main portions of the second electrodes and the fourth electrodes are configured to generate surface containment electric fields that inhibit movement of the ions within the ion containment space toward the first surface and the second surface; and
opposing edge portions of the first electrodes and the fourth electrodes are configured to receive RF voltages that are phase-shifted with respect to one another and generate a first edge containment electric field that inhibit movement of the ions within the ion containment space toward a first side of the ion containment space.

14. The ion guide of claim 13, wherein opposing edge portions of the second electrodes and the third electrodes are configured to receive RF voltages that are phase-shifted with respect to one another and generate a second edge containment electric field that inhibits movement of the ions within the ion containment space toward a second side of the ion containment space.

15. The ion guide of claim 13, wherein additional opposing edge portions of the first electrodes and the fourth electrodes generate a second edge containment electric field that inhibit movement of the ions within the ion containment space toward a second side of the ion containment space.

16. The ion guide of claim 13, wherein:
each first electrode extends, along the longitudinal axis of the ion containment space, to an adjacent second electrode; and each fourth electrode extends, along the longitudinal axis of the ion containment space, to an adjacent third electrode.

17. The ion guide of claim 13, wherein the first electrodes and the fourth electrodes have an L-shape, a T-shape, or a Y-shape.

18. The ion guide of claim 13, wherein the first electrodes and the fourth electrodes have an LL-shape, a TT-shape, or a YY-shape.

19. An ion guide comprising:
   a plurality of electrodes arranged on opposing surfaces and defining an ion containment space in a gap between the opposing surfaces, wherein:
      each electrode of the plurality of electrodes comprises an elongate main portion and an edge portion at an end of the main portion, the edge portion being wider, along a longitudinal axis of the ion containment space, than the main portion;
      the plurality of electrodes are configured to receive RF voltages; and
      the plurality of electrodes are arranged so that opposing edge portions receive RF voltages that are phase-shifted with respect to one another.

20. The ion guide of claim 19, wherein the plurality of electrodes are arranged so that opposing main portions receive RF voltages of a same phase.

* * * * *